US011254095B2

(12) United States Patent
Hart et al.

(10) Patent No.: US 11,254,095 B2
(45) Date of Patent: Feb. 22, 2022

(54) HIGH HARDNESS ARTICLES INCLUDING AN OPTICAL LAYER AND METHODS FOR MAKING THE SAME

(71) Applicant: Corning Incorporated, Corning, NY (US)

(72) Inventors: Shandon Dee Hart, Elmira, NY (US); Karl William Koch, III, Elmira, NY (US); Carlo Anthony Kosik Williams, Painted Post, NY (US); Charles Andrew Paulson, Painted Post, NY (US); James Joseph Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 242 days.

(21) Appl. No.: 16/586,031

(22) Filed: Sep. 27, 2019

(65) Prior Publication Data

US 2020/0101692 A1 Apr. 2, 2020

Related U.S. Application Data

(60) Provisional application No. 62/738,136, filed on Sep. 28, 2018.

(51) Int. Cl.
*B32B 7/023* (2019.01)
*B32B 7/022* (2019.01)
*B44F 1/02* (2006.01)

(52) U.S. Cl.
CPC .............. *B32B 7/023* (2019.01); *B32B 7/022* (2019.01); *B44F 1/02* (2013.01); *B32B 2551/00* (2013.01)

(58) Field of Classification Search
CPC ..... B32B 7/023; B32B 7/022; B32B 2551/00; C03C 2217/734; C03C 17/3435;
(Continued)

(56) References Cited

U.S. PATENT DOCUMENTS 3,858,977 A 1/1975 Baird et al.
4,705,356 A 11/1987 Berning et al.
(Continued)

FOREIGN PATENT DOCUMENTS

GB 915870 A 1/1963
JP 2009-078458 A 4/2009
(Continued)

OTHER PUBLICATIONS

Oliver et al; "An Improved Technique for Determining Hardenss and Elastic Modulus Using Load and Displacement Sensing Indentation Experiments"; J. Mater. Res., vol. 7, No. 6 (1992) pp. 1564-1583.
(Continued)

*Primary Examiner* — Nancy R Johnson
(74) *Attorney, Agent, or Firm* — William J. Tucker; Shantanu Pathak

(57) ABSTRACT

An article, comprising an optical layer disposed on a transparent layer, can have a maximum hardness of about 10 GigaPascals (GPa) to about 50 GPa. The optical layer can comprise a first portion and a second portion that are contiguous with one another at one major surface the optical layer. The portions may exhibit specific differences in average reflectance value, observed color, and/or angular color shift relative to each other. In some embodiments, a photopic average reflectance of the first portion may differ from an average reflectance of the second portion by about 5% or more. In other embodiments, a color of the first portion can have a color difference from a color of the second portion of about 4 or more in CIE color coordinate space.

21 Claims, 7 Drawing Sheets

(58) Field of Classification Search
CPC .. B44C 1/005; B44C 1/18; B44C 1/22; B44C 3/005; B44C 3/02; B44C 3/025; B44F 1/02
See application file for complete search history.

(56) References Cited

U.S. PATENT DOCUMENTS

| | | | |
|---|---|---|---|
| 4,930,866 A | 6/1990 | Berning et al. | |
| 5,278,590 A | 1/1994 | Phillips et al. | |
| 5,731,898 A | 3/1998 | Orzi et al. | |
| 7,851,054 B2 | 12/2010 | Weber et al. | |
| 8,792,165 B2 | 7/2014 | Merrill et al. | |
| 9,079,802 B2 | 7/2015 | Bellman et al. | |
| 9,122,073 B2 | 9/2015 | Macionczyk et al. | |
| 9,335,444 B2 | 5/2016 | Hart et al. | |
| 9,359,261 B2 | 6/2016 | Bellman et al. | |
| 9,366,784 B2 | 6/2016 | Bellman et al. | |
| 9,798,055 B2 | 10/2017 | Walter et al. | |
| 9,964,677 B2 | 5/2018 | Merrill et al. | |
| 10,162,084 B2 | 12/2018 | Hart et al. | |
| 2009/0080076 A1 | 3/2009 | Fujikura et al. | |
| 2013/0280463 A1* | 10/2013 | On | B32B 3/10 428/38 |
| 2015/0322270 A1* | 11/2015 | Amin | C09D 5/006 428/141 |
| 2015/0323705 A1 | 11/2015 | Hart et al. | |
| 2017/0075039 A1 | 3/2017 | Hart et al. | |
| 2017/0197384 A1* | 7/2017 | Finkeldey | C03C 3/091 |
| 2018/0072021 A1 | 3/2018 | Weber et al. | |
| 2018/0275318 A1 | 9/2018 | Amin et al. | |

FOREIGN PATENT DOCUMENTS

| | | |
|---|---|---|
| WO | 2015142837 A1 | 9/2015 |
| WO | 2015179739 A1 | 11/2015 |

OTHER PUBLICATIONS

Oliver et al; "Measurement of Hardness and Elastic Modulus By Instrumented Indentation: Advances in Understanding and Refinements To Methodology"; J. Mater. Res., vol. 19, No. 1, (2004) pp. 3-20.

Wang et al; "Toward Hard yet Tough Ceramic Coatings"; Surface & Coating Technology; 258 (2014) pp. 1-16.

International Search Report and Written Opinion of the European International Searching Authority; PCT/US2019/053367; dated Jan. 2, 2020; 10 Pgs.

* cited by examiner

HIGH HARDNESS ARTICLES INCLUDING AN OPTICAL LAYER AND METHODS FOR MAKING THE SAME

CROSS REFERENCE TO RELATED APPLICATIONS

This application claims the benefit of priority under 35 U.S.C. § 119 of U.S. Provisional Application Ser. No. 62/738,136, filed on Sep. 28, 2018, the content of which is relied upon and incorporated herein by reference in its entirety.

The present disclosure relates generally to high hardness articles and coatings including an optical layer and methods for making the same and, more particularly, to high hardness articles and coatings with portions exhibiting different characteristics and methods for making the same.

BACKGROUND

Known multi-layer interference stacks are susceptible to wear or abrasion. Such abrasion can compromise any optical performance improvements achieved by the multi-layer interference stack. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the desirable mechanical properties, for example hardness, for use in mobile devices, architectural articles, transportation articles or appliance articles. Nitrides and diamond-like coatings may exhibit high hardness values, but such materials do not exhibit the transmittance desired for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials experiencing abrasion damage can also oxidize or undergo other chemical reactions, which further degrades the durability of the coating.

Known multi-layer interference stacks are also susceptible to scratch damage and, often, even more susceptible to scratch damage than the underlying substrates on which such coatings are disposed. In some instances, a significant portion of such scratch damage includes microductile scratches, which typically include a single groove in a material having extended length and with depths in the range from about 100 nm to about 500 nm. Microductile scratches may be accompanied by other types of visible damage, for example sub-surface cracking, frictive cracking, chipping and/or wear. Evidence suggests that a majority of such scratches and other visible damage is caused by sharp contact that occurs in a single contact event. Once a significant scratch appears, the appearance of the article is degraded since the scratch causes an increase in light scattering, which may cause significant reduction in optical properties. Single event scratch damage can be contrasted with abrasion damage. Single event scratch damage is not caused by multiple contact events, for example reciprocating sliding contact from hard counter face objects (e.g., sand, gravel, and sandpaper), nor does it typically generate heat, which can degrade chemical bonds in the film materials and cause flaking and other types of damage. In addition, single event scratching typically does not cause oxidization or involve the same conditions that cause abrasion damage and therefore, the solutions often utilized to prevent abrasion damage may not also prevent scratches. Moreover, known scratch and abrasion damage solutions often compromise the optical properties.

Further, known multi-layer interference stacks designed for viewing screens and displays are typically designed to have consistent color and reflectance properties across a wide range of viewing angles. However, there is a need for articles that are optically distinctive or can be used to convey a message when viewed from one side while still maintaining transmittance suitable for particular applications on the other side. Similarly, there is a need for articles that are optically distinctive or can be used to convey a message when viewed from a first side in reflectance while maintaining transmittance suitable for particular applications when viewed from the first side.

Accordingly, there is a need for sets of new multi-layer interference stacks, and methods for their manufacture, which have similar composition but different optical properties while being abrasion resistant and scratch resistant. Such coatings and layers are needed to convey information such as a logo or signage on a glass surfaces, where the coatings and layers are highly durable, scratch resistant, abrasion resistant, and damage resistant.

SUMMARY

There are set forth methods for making an apparatus with visually distinctive portions that can be patterned to convey information, for example a trademark or a logo. Features of the disclosure include the high hardness of the article, including portions associated with the different optical characteristics. These optical characteristics can differ in one or more of an average reflectance, observed color, or color-shifting properties. Such distinctive optical characteristics can catch the attention of persons viewing the article and convey a message to them. The article is designed such that it is still relatively transparent when the other side is viewed in transmittance. The high hardness, scratch resistance, or abrasion resistances prevents the degradation of the distinctive optical characteristics. Consequently, such articles can be used in a wide variety of applications where surface damage is an issue.

Some example embodiments of the disclosure are described below with the understanding that any of the embodiments may be used alone or in combination with one another.

EMBODIMENT 1

An article can comprise a transparent layer comprising a first major surface. The article can further comprise an optical layer with a first major surface and a second major surface. The second major surface of the optical layer can be disposed on the first major surface of the transparent layer. The optical layer can further comprise a first portion and a second portion that are contiguous with one another at one of the first major surface and the second major surface of the optical layer. The first portion can be defined between the first major surface and the second major surface of the optical layer by at least one sub-layer. The second portion can be defined between the first major surface and the second major surface of the optical layer by a plurality of stacked sub-layers. A color of the first portion can have a color difference from a color of the second portion of about 4 or more for at least one viewing angle, wherein the color difference may be calculated using the equation $\sqrt{(a^*_2-a^*_1)^2+(b^*_2-b^*_1)^2}$, with $a^*_1$ and $b^*_1$ representing the CIE color coordinates of the first portion viewed at a viewing angle and $a^*_2$ and $b^*_2$ representing the CIE color coordinates of the second portion viewed at the same viewing angle. The article can have maximum hardness of from about 10 GigaPascals (GPa) to about 50 GPa as measured by a Berkovich Indenter Hardness Test having an indentation depth from about 100 nanometers (nm) to about 500 nm in the article.

EMBODIMENT 2

The article of embodiment 1, where each of the first portion and the second portion comprise a reflectance value of the first major surface of the optical layer comprising a photopic average over optical wavelengths, and an absolute value of a difference between the reflectance value of the first portion and the reflectance value of the second portion can be about 5% or more.

EMBODIMENT 3

The article of any one of embodiments 1-2, where at least one of the first or second portions can exhibit reflectance color coordinates in the (L*, a*, b*) colorimetry system for at least one incidence angle from 0 degrees to 90 degrees under an International Commission on Illumination illuminant exhibiting a reference point color shift that may be about 12 or more from a reference point comprising at least one of the color coordinates (a*=0, b*=0), or the reflectance color coordinates of the corresponding portion of the article viewed at a reference angle. The reference point may be the color coordinates (a*=0, b*=0), where the color shift can be defined by the equation $\sqrt{(a^*_{article})^2+(b^*_{article})^2}$, with $a^*_{article}$ and $b^*_{article}$, which can represent the CIE color coordinates of the article viewed at a reference viewing angle and angle of illumination. Alternatively, the reference point may be the color coordinates of that portion viewed at a reference angle, where the color shift can be defined by the equation $\sqrt{(a^*_{article}-a^*_{ref})^2+(b^*_{article}-b^*_{ref})^2}$. $a^*_{article}$ and $b^*_{article}$ can represent the CIE color coordinates of the article viewed at a reference viewing angle and angle of illumination and $a^*_{ref}$ and $b^*_{ref}$ can represent the CIE color coordinates of the corresponding portion viewed at a reference viewing angle and angle of illumination.

EMBODIMENT 4

The article of any one of embodiments 1-3, a difference between reflectance color coordinates in the (L*, a*, b*) colorimetry system for at least one incidence angle from 0 degrees to 90 degrees under an International Commission on Illumination illuminant exhibited by the first portion and the second portion may exhibit a reference point color shift of about 12 or more from a reference point comprising at least one of the color coordinates (a*, b*) of the difference in the reflectance color coordinates between the first portion and the second portion. The color shift can be defined by $\sqrt{(a^*_2-a^*_{2,ref}-a^*_1+a^*_{1,ref})^2+(b^*_2-b^*_{2,ref}-b^*_1+b^*_{1,ref})^2}$. $a^*_1$ and $b^*_1$ can represent the CIE color coordinates of the first portion viewed at a viewing angle. $a^*_2$ and $b^*_2$ can represent the CIE color coordinates of the second portion at the same viewing angle as the viewing angle for the first portion. $a^*_{1,ref}$ and $b^*_{1,ref}$ can represent the CIE color coordinates of the first portion viewed at a reference viewing angle and angle of illumination. $a^*_{2,ref}$ and $b^*_{2,ref}$ can represent the CIE color coordinates of the second portion viewed at the same reference viewing angle as the reference viewing angle for the first portion.

EMBODIMENT 5

An article can comprise a transparent layer comprising a first major surface. The article can further comprise an optical layer comprising a first major surface and a second major surface. The second major surface of the optical layer can be disposed on the first major surface of the transparent layer. The optical layer can further comprise a first portion and a second portion that may be contiguous with one another at one of the first major surface and the second major surface of the optical layer. The first portion may be defined between the first major surface and the second major surface of the optical layer by at least one sub-layer. The second portion may be defined between the first major surface and the second major surface of the optical layer by a plurality of stacked sub-layers. Each of the first portion and the second portion may comprise a reflectance value of the first major surface of the optical layer that can be a photopic average over optical wavelengths. An absolute value of a difference between the reflectance value of the first portion and the second portion can be about 5% or more. A color of the first portion can have a color difference from a color of the second portion that may be about 4 or less for at least one viewing angle, where color difference may be calculated using the equation $\sqrt{(a^*_2-a^*_1)^2+(b^*_2-b^*_1)^2}$. $a^*_1$ and $b^*_1$ may represent the CIE color coordinates of the first portion viewed at a viewing angle. $a^*_2$ and $b^*_2$ may represent the CIE color coordinates of the second portion that can be viewed at the same viewing angle. The article may have a maximum hardness of from about 10 GigaPascals (GPa) to about 50 GPa, which can be measured by a Berkovich Indenter Hardness Test having an indentation depth from about 100 nm to about 500 nm in the article.

EMBODIMENT 6

The article of embodiment 5, where the color difference between the color of the first portion and the color of the second portion can be about 4 or less for all viewing angles.

EMBODIMENT 7

The article of any one of embodiments 1-6, where the second portion of the optical layer comprises more sub-layers than the first portion of the optical layer.

EMBODIMENT 8

The article of any one of embodiments 1-7, where at least one difference between a thickness of a sub-layer of the second portion and a thickness of a corresponding sub-layer of the first portion is about 20 nm or more.

EMBODIMENT 9

The article of any one of embodiments 1-8, where the plurality of sub-layers of the second portion can comprise a first sub-layer having a first refractive index and a second sub-layer having a second refractive index. A difference between the first refractive index and the second refractive index can be about 0.01 or more.

EMBODIMENT 10

The article of any one of embodiments 1-9, where each of the first and second portions may comprise from 1 to 10 sets of sub-layers. Each set of sub-layers can comprise a first sub-layer having a first refractive index and a second sub-layer having a second refractive index that may be lower than the first refractive index.

EMBODIMENT 11

The article of any one of embodiments 9-10, where the first sub-layer can comprise at least one of $Si_uAl_vO_xN_y$, AlN, $Si_3N_4$, $AlO_xN_y$, $SiO_xN_y$, $ZrO_2$, or $Al_2O_3$. The second sub-layer can comprise at least one of $SiO_2$, $Al_2O_3$, SiO, $AlO_xN_y$, $SiO_xN_y$, or $Si_uAl_vO_xN_y$.

EMBODIMENT 12

The article of any one of embodiments 1-11, where the maximum hardness may be from about 12 GPa to about 50 GPa.

EMBODIMENT 13

The article of any one of embodiments 1-12, where the maximum hardness of the article may be exhibited in both a first portion of the article associated with the first portion of the optical layer and in a second portion of the article associated with the second portion of the optical layer.

EMBODIMENT 14

The article of any one of embodiments 1-13, where a hardness may be from about 10 GPa to about 50 GPa, measured at all indentation depths from about 100 nm to about 500 nm.

EMBODIMENT 15

The article of any one of embodiments 1-14, where a hardness may be from about 10 GPa to about 50 GPa, measured at all indentation depths from about 100 nm to about 500 nm both in a first portion of the article associated with the first portion of the optical layer and in a second portion of the article associated with the second portion of the optical layer.

EMBODIMENT 16

The article of any one of embodiments 1-15, where the article may exhibit an abrasion resistance after a 500-cycle abrasion that can be measured using a Taber Test on at least one of the first major surface of the optical layer or the first major surface of the article, wherein the abrasion resistance may comprise any one or more of the following: about 1% haze or less, as measured using a hazemeter having an aperture of about 8 mm; an average roughness (Ra) that may be measured by atomic force microscopy and can be about 12 nm or less; a scattered light intensity that can be about 0.05 (in units of 1/steradian) or less, at a polar scattering angle of about 40 degrees or less, as may be measured at normal incidence in transmission using an imaging sphere for scatter measurements, with an aperture that can be 2 mm at a wavelength of 600 nm; and a scattered light intensity that can be about 0.1 (in units of 1/steradian) or less, at a polar scattering angle of about 20 degrees or less, as may be measured at normal incidence in transmission using an imaging sphere for scatter measurements, with an aperture that can be 2 mm at a wavelength that may be 600 nm.

EMBODIMENT 17

The article of any one of embodiments 1-16, where the second major surface of the optical layer can be in direct physical contact with the first major surface of the transparent layer.

EMBODIMENT 18

The article of any one of embodiments 1-17, where the first major surface of the optical layer can be part of a first major surface of the article.

EMBODIMENT 19

The article of any one of embodiments 1-18, where the first major surface of the transparent layer can comprise a curved surface.

EMBODIMENT 20

The article of any one of embodiments 1-19, where an area of the first major surface of the optical layer defining the first portion or an area of the second major surface of the optical layer defining the second portion can be from about 100 μm² to about 5 cm².

EMBODIMENT 21

The article of any one of embodiments 1-20, where the second portion may consist of exactly one more sub-layer than the first portion.

EMBODIMENT 22

The article of any one of embodiments 1-21, where 5 or more sub-layers in the first portion can be the same thickness and refractive index as 5 or more sub-layers in the second portion.

EMBODIMENT 23

A consumer electronic product, comprising:
a housing comprising a front surface, a back surface and side surfaces;
electrical components at least partially within the housing, the electrical components comprising at least a controller, a memory, and a display, the display at or adjacent the front surface of the housing; and
a cover substrate disposed over the display,
wherein at least one of a portion of the housing or the cover substrate comprises the article of any one of Embodiments 1-22.

EMBODIMENT 24

A method for making the article of any one of embodiments 1-22. The method may comprise applying a first material with respect to the first major surface of the transparent layer, which can produce a first sub-layer of the first portion and the second portion of the optical layer. The method may further comprise masking the first portion of the optical layer. Additionally, the method may comprise applying a second material to a first major surface of the first sub-layer, which can produce a second sub-layer of the second portion of the optical layer. Further, the method may comprise removing the mask.

EMBODIMENT 25

The method of embodiment 24, where the first material and the second material are the same.

EMBODIMENT 26

A method for making the article of any one of embodiments 1-22. The method may comprise applying a first material with respect to the first major surface of the transparent layer, which can produce a first sub-layer of the first portion and the second portion of the optical layer. The method may further comprise applying a second material to a first major surface of the first sub-layer, which can produce a second sub-layer of the first portion and the second portion of the optical layer. Additionally, the method may comprise masking the second portion of the optical layer. Further, the method may comprise removing the second sub-layer of the first portion with etchant. Also, the method may comprise removing the mask.

EMBODIMENT 27

The method of embodiment 26, where the etchant may be effective to etch the second material and may not be effective to etch the first material.

BRIEF DESCRIPTION OF THE DRAWINGS

The above and other features and advantages of embodiments of the present disclosure are better understood when the following detailed description is read with reference to the accompanying drawings, in which.

DETAILED DESCRIPTION

Figure 1:
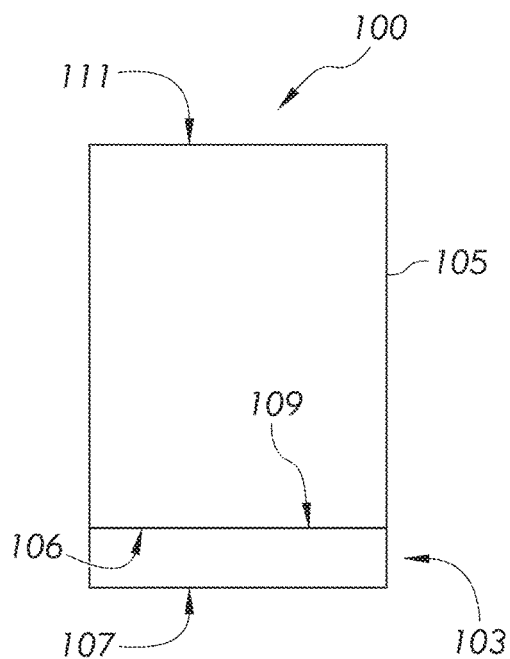
FIG. 1 is a side view of an article, according to one or more embodiments.

Embodiments will now be described more fully hereinafter with reference to the accompanying drawings in which example embodiments are shown. Whenever possible, the same reference numerals are used throughout the drawings to refer to the same or like parts. However, claims may encompass many different aspects of various embodiments and should not be construed as limited to the embodiments set forth herein.

Throughout the disclosure, the drawings are used to emphasize certain aspects. As such, it should not be assumed that the relative size of the different layers, coatings, portions, and substrates shown in the drawings are proportional to its actual relative size, unless explicitly indicated otherwise.

FIG. 1 illustrates a side view of an article 100 according to one or more embodiments of the disclosure. The article 100 may include a transparent layer 103 and a surface coating 105. The transparent layer 103 includes a first major surface 109 and a second major surface 107 opposed to the first major surface 109. The surface coating 105 can be disposed on the transparent layer such that a second major surface 106 of the surface coating 105 faces the first major surface 109 of the transparent layer 103. The second major surface 107 of the transparent layer 103 is shown in FIG. 1 as being a second major surface of the article 100; however, additional coatings may be disposed on the second major surface 107 of the transparent layer 103. The surface coating 105 can further comprise a first major surface 111 opposite the second major surface 106. In some embodiments, as illustrated, the first major surface 111 of the surface coating 105 can be the first major surface of the article 100.

For some applications, a preselected difference in reflectance, color, and/or color shifting may be desired between contiguous portions in a hardcoating that also provides high hardness and scratch resistance. These applications may include markings on the article 100. For example, an article that may be provided with such attributes can include sunglasses, RF transparent backings or housings of smartphones and similar devices, heads-up display systems, automotive windows, mirrors, display surfaces, architectural glass and surfaces, and other decorative, optical, display, or protective applications. Such displays can include liquid crystal displays (LCDs), electrophoretic displays (EPD), organic light emitting diode displays (OLEDs), plasma display panels (PDPs), and touch sensors. Other embodiments of articles can include automotive glass for windows, sunroofs, or lamp covers. In such articles, the coatings can provide an aesthetic reflection or color while having high scratch and weathering resistance. In addition, it may be desirable for any of the above articles that the reflectance and/or color shows the minimal change in optical properties when a scratch or damage occurs to the coated surface.

The transparent layer 103 can be an amorphous inorganic material (e.g., glass), a crystalline material (e.g., sapphire, single crystal or polycrystalline alumina, spinel (MgAl$_2$O$_4$)), or a polymer. Examples of suitable polymers include, without limitation, copolymers and blend thereof: thermoplastics including polystyrene (PS), polycarbonate (PC), polyesters including polyethyleneterephthalate (PET), polyolefins including polyethylene (PE), polyvinylchloride (PVC), acrylic polymers including polymethyl methacrylate (PMMA), thermoplastic urethanes (TPU), polyetherimide (PEI), epoxies, silicones including polydimethylsiloxane (PDMS), and blends of these polymers with each other. Examples of glass, which may be strengthened or non-strengthened and may be free of lithia or not, include soda lime glass, alkali aluminosilicate glass, alkali containing borosilicate glass and alkali aluminoborosilicate glass. As used herein, the term "strengthened" when applied to a substrate, for example glass or another transparent layer 103, may refer to a substrate that has been chemically strengthened, for example through ion-exchange of larger ions for smaller ions in the surface of the substrate. However, other strengthening methods known in the art, for example thermal tempering, or utilizing a mismatch of the coefficient of thermal expansion between portions of the substrate to create compressive stress and central tension regions, may be utilized to form strengthened substrates. The transparent layer 103 may have a thickness measured from the first major surface 109 to the second major surface 107 of the transparent layer that may be from about 10 micrometers (microns, μm) to about 100 millimeters (mm), from about 25 μm to about 10 mm, from about 100 μm to about 5 mm, or from about 200 μm to about 1 mm, or from about 300 μm to about 600 μm.

The transparent layer 103 may be a substantially flat planar layer, although other embodiments may utilize a curved or otherwise shaped or sculpted layer. The transparent layer 103 may be substantially optically clear, transparent, and free from light scattering. Throughout the disclosure, a clear transparent layer is a layer that exhibits an photopic average light transmission over optical wavelengths of about 85% or greater, about 86% or greater, about 87% or greater, about 88% or greater, about 89% or greater, about 90% or greater, about 91% or greater or about 92% or greater. In a photopic average, the value at each wavelength is weighted by the CIE photopic luminosity function, which was designed to approximate the response of the human eye. In one or more alternative embodiments, the transparent layer may be tinted or colored like sunglasses or automotive glass. In such embodiments, the tinted or colored transparent layer may still exhibit a photopic average light transmission over optical wavelengths of about 10% or more, about 30% or more, from about 10% to about 70%, or from about 10% to about 30%. In other embodiments, the optical layers of the disclosure can be used in combination with a semi-transparent layer that may exhibit a photopic average light transmission over optical wavelengths of about 9% or less, about 5% or less, about 1% or less, or within a range from about 1% to about 9%, from about 1% to about 5%, from about 0.1% to about 9%, from about 0.1% to about 5%, or from about 0.1% to about 1%. In some embodiments, the light reflectance and transmittance values may be a total reflectance or total transmittance (considering reflectance or transmittance on both major surfaces of the transparent layer 103) or may be observed on a single side of the transparent layer 103 (i.e., the first major surface 111 of the article 100, without considering the opposite surface). Unless otherwise specified, the average reflectance or transmittance is measured at an incident illumination angle of about 0 degrees, which is often referred to as normal or near-normal incidence. Reflectance measurements for near normal incidence may be provided for an actual angle of incidence of about 10 degrees or less, about 8 degrees or less, about 6 degrees or less, about 5 degrees or less, from about 5 degrees to about 10 degrees, or from about 6 degrees to about 8 degrees. However, reflectance and transmittance measurements can be provided at other incident illumination angles, for example, about 45 degrees or about 60 degrees. The transparent layer 103 may optionally exhibit a color, for example white, black, red, blue, green, yellow, orange etc.

The second major surface 107 of the transparent layer 103 may or may not also be the second major surface of the article 100. In some of the applications discussed above, the second major surface 107 of the transparent layer 103 may be attached to a device. In other embodiments, the second major surface 107 of the transparent layer 103 may have a surface coating that may or may not be the same as the surface coating 105 disposed on first major surface 109 of the transparent layer 103. For example, the surface coating on the second major surface 107 of the transparent layer 103 may comprise an easy-to-clean coating, a low-friction coating, an oleophobic coating, a diamond-like coating, a scratch-resistant coating, an abrasion-resistant coating, an anti-glare coating, an anti-reflective coating, an adhesive coating, or a combination thereof. Exemplary materials for such coatings are discussed below.

As used herein, the term "disposing" includes coating, depositing and/or forming a material onto a surface using any known method in the art. The disposed material may constitute a layer, as defined throughout the disclosure. The phrase "disposed on" includes embodiments of forming a material onto a surface such that the material is in direct contact with the surface and also includes embodiments where the material is formed on a surface, with one or more intervening material(s) positioned between the disposed material and the surface. In some of the embodiments, the intervening material(s) may constitute one or more layers.

Figure 2:
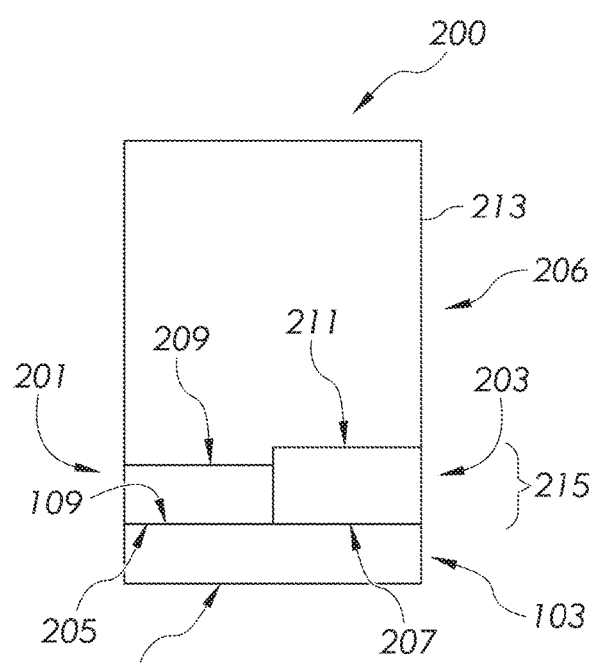
FIG. 2 is a side view of an article, according to one or more further embodiments.
Figure 3:
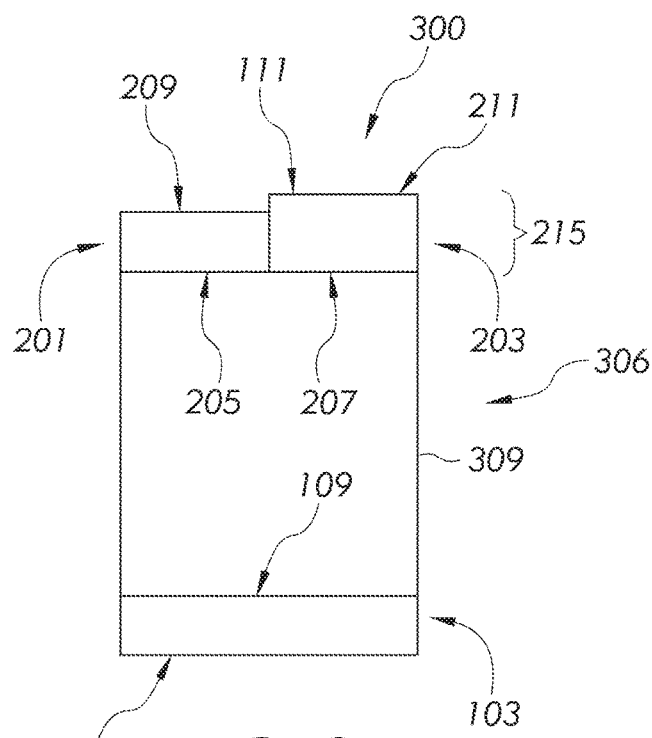
FIG. 3 is a side view of an article, according to one or more further embodiments.

In some embodiments, as shown in FIG. 2, the surface coating 206 may comprise an optical layer 215 and an outer layer 213, where the optical layer 215 is closer to the transparent layer 103 than is the outer layer 213. In other embodiments, as shown in FIG. 3, the surface coating 306 may comprise an inner layer 309 and an optical layer 215, where the optical layer 215 is further from the transparent layer 103 than is the inner layer 309. In yet other embodiments, the surface coating may comprise an outer layer (e.g., 213) and optical layer 215, and an inner layer (e.g., 309), where the optical layer 215 is sandwiched between the outer layer and the inner layer.

The average thickness of the surface coating 105 may be about 1 μm or greater while still providing an article that exhibits the optical and mechanical performance described herein. In some embodiments, the physical thickness of the surface coating 105 may be in the range from about 200 nanometers (nm) to about 5 mm, from about 200 nm to about 1 mm, from about 200 nm to about 500 μm, from about 500 nm to about 5 mm, from about 500 nm to about 1 mm, from about 500 nm to about 500 μm, from about 500 nm to about 100 μm, from about 500 nm to about 20 μm, from about 1 μm to about 5 mm, from about 1 μm to about 1 mm, from about 1 μm to about 500 μm, from about 1 μm to about 200 μm, from about 1 μm to about 100 μm, from about 1 μm to about 50 μm from about 1 μm to about 20 μm, from about 1 μm to about 10 μm, or from about 1 μm to about 5 μm. The surface coating 105 may include hard oxide, nitride, or oxynitride layers, optionally in combination with metallic layers. In some cases, there may be no metals in the structure, and the high reflectance and/or color may be entirely generated by optical interference in a designed multilayer optical coating comprising hard coating materials. The absence of metals from the structure may improve the overall adhesion and scratch resistance of the coated article.

FIG. 2 illustrates embodiments of an article 200, where a surface coating 206 comprises an optical layer 215 and an outer layer 213. In some embodiments, the outer layer 213 may comprise an easy-to-clean coating, a low-friction coating, an oleophobic coating, a diamond-like coating, a scratch-resistant coating, an abrasion-resistant coating, or a combination thereof. The materials making up the outer layer 213 can include hard oxide, nitride, or oxynitride layers, optionally in combination with metallic layers. For example, the scratch-resistant coating may comprise an oxynitride, for instance, aluminum oxynitride or silicon oxynitride with a thickness of about 500 µm or more. In such embodiments, the abrasion-resistant layer may comprise the same material as the scratch-resistant layer. In some embodiments, the physical thickness of the scratch-resistant coating may be in the range from about 1 nm to 1 mm, from about 25 nm to about 1 mm, from about 200 nm to about 1 mm, from about 500 nm to about 1 mm, from about 1 µm to about 1 mm, from about 100 nm to about 500 µm, from about 500 nm to about 500 µm, from about 1 µm to about 500 µm, from about 1 µm to about 200 µm, from about 1 µm to about 100 µm, or from about 1 µm to about 50 µm. In some embodiments, a low-friction coating may comprise a highly fluorinated silane coupling agent, for instance, an alkyl fluorosilane with oxymethyl groups pendant on the silicon atom. In such embodiments, an easy-to-clean coating may comprise the same material as the low-friction coating. In other embodiments, the easy-to-clean coating may comprise a protonatable group such as an amine, for instance, an akyl aminosilane with oxymethyl groups pendant on the silicon atom. In such embodiments, the oleophobic coating may comprise the same material as the easy-to-clean coating. In some embodiments, a diamond-like coating comprises carbon and may be created by applying a high voltage potential in the presence of a hydrocarbon plasma.

As shown in FIG. 2, the optical layer 215 can be in direct physical contact with first major surface 109 of the transparent layer 103. In some embodiments, the optical layer 215 can comprise a first portion 201 and a second portion 203 that are contiguous with one another at one of the first major surface and the second major surface of the optical layer 215. In some embodiments, portions may be defined as being contiguous at a surface when they share a common border at that surface. In other embodiments, portions may be defined as being contiguous at a surface when they are adjacent to one another. As shown in FIG. 2, the first portion 201 is contiguous with the second portion 203 at both the first and second major surfaces of the optical layer 215 both because the portions 201, 203 are adjacent to each other at the corresponding major surface and because the portions 201, 203 share a common border perpendicular to the corresponding major surface. Here, the first major surface of the optical layer 215 may be defined by the corresponding first major surfaces 209, 211 of the first and second portions 201, 203. Likewise, the second major surface of the optical layer 215 may be defined by the corresponding second major surfaces 205, 207 of the first and second portions 201, 203. The average thickness of each of the first and second portion 201, 203 is defined by distance between the corresponding first major surface 209, 211 and second major surface 205, 207.

FIG. 3 illustrates embodiments of an article 300, where a surface coating 306 can comprise an optical layer 215 and an inner layer 309. The inner layer 309 may comprise a scratch-resistant coating, an anti-glare coating, an abrasion-resistant coating, or a combination thereof. The anti-glare coating may comprise hard oxide, nitride, or oxynitride layers, optionally in combination with metallic layers, which may be the same or similar materials to the optical layer 215. The first major surface of the optical layer 215 may be defined by the corresponding first major surfaces 209, 211 of the first and second portions 201, 203. As shown, the first major surface of the optical layer 215 can be the first major surface 111 of the article 300. The second major surface of the optical layer 215 may be defined by the corresponding second major surfaces 205, 207 of the first and second portions 201, 203. The thickness of each of the first and second portion 201, 203 is defined by the average distance between the corresponding first major surface and second major surface.

The first portion 201 and the second portion 203 each contain at least one sub-layer. In some embodiments, the second portion 203 contains at least one more sub-layer than the first portion 201. Furthermore, as shown in FIG. 2, the second portion 203 can include a greater thickness than the first portion 201. In some embodiments, the only difference between the first portion 201 and the second portion 203 may be an additional sub-layer in the second portion 203 relative to the first portion 201. In other embodiments, the first portion 201 and the second portion 203 may have substantially the same thickness. For instance, a difference in the thickness of one or more sub-layers in the first portion 201 relative to the thickness of one or more sub-layers in the second portion 203 can offset the thickness of an additional sub-layer in the second portion 203.

As shown in FIG. 2, the first major surface 209 of the first portion 201 may not be aligned along a common plane with first major surface 211 of the second portion 203. Nonetheless, the first portion 201 is still contiguous with the second portion 203 at both the first the first and second major surfaces of the optical layer 215 both because the portions 201, 203 are adjacent to each other at the corresponding major surface and because the portions 201, 203 share a common border perpendicular to the corresponding major surfaces. In some embodiments, the outer layer 213 has a different thickness in a portion corresponding to the first portion 201 of the optical layer 215 than another portion corresponding to the second portion 203 of the optical layer 215. Other embodiments may have a uniform thickness of the outer layer 213. In other embodiments, the second major surface 205 of the first portion 201 may not be aligned with second major surface 207 of the second portion 203. In some embodiments, the transparent layer 103 may have a different thickness in a portion corresponding to the first portion 201 of the optical layer 215 than another portion corresponding to the second portion 203 of the optical layer 215.

Throughout the disclosure, the term "layer" may include a single layer or may include one or more sub-layers. In some embodiments, a stack of sub-layers may be provided with each sub-layer in the stack being in direct contact with at least one other sub-layer in the stack. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers. A layer or sub-layers may be formed by various techniques, for example discrete deposition and/or continuous deposition processes. In one or more embodiments, the layer may be formed using only continuous deposition processes, or, alternatively, only discrete deposition processes.

In some embodiments, the thickness of the first portion 201 may be different from the thickness of the second portion 203. As shown in FIG. 3 the first major surface 209 of the first portion 201 may not be aligned with first major surface 211 of the second portion 203. Nonetheless, the first portion 201 is still contiguous with the second portion 203 at both the first the first and second major surfaces of the optical layer 215 both because the portions 201, 203 are adjacent to each other at the corresponding major surfaces and because the portions 201, 203 share a common border perpendicular to the corresponding major surfaces. In some embodiments, the first major surface 111 of the article 300 is uneven. In other embodiments, the second major surface 205 of the first portion 201 may not be aligned with the second major surface 207 of the second portion 203. In some embodiments, the inner layer 309 may have a different thickness in a portion corresponding to the first portion 201 of the optical layer 215 than another portion corresponding to the second portion 203 of the optical layer 215.

In other embodiments, the optical layer 215 may or may not have a major surface in common with the surface coating 306. Instead, the optical layer 215 could be buried within the surface coating 105 of the article 100, as discussed above. In some embodiments, the surface coating could comprise an optical layer 215 sandwiched between an outer layer 213 and an inner layer 309. In such embodiments, performance of the optical layer 215 can be insensitive to removal of the top 50-500 nm of the surface coating 105 (i.e., the outer layer 213). This means that in addition to the protection of high hardness, the optical design can also be tailored to reduce visibility of damage sites if damage does occur.

Additionally, in embodiments where there is a scratch-resistant layer between the optical layer 215 and the first major surface 111 of the article 100, the scratch resistance of the article 100 may be enhanced. The amount of material with a refractive index of about 1.7 or less situated between the first major surface 111 of the article and a thick scratch-resistant layer may be zero, may be about 1 nm or more, or may be from about 1 nm to about 250 nm. This thick scratch-resistant layer need not be truly a single material or a single layer, but rather the thick hard layer can comprise many thin layers or nanolayers, for example in a "superlattice" structure, or other hard layer structures comprising multiple materials, compositions, or structural layers or gradients. Examples of suitable materials for a scratch-resistant layer or coating include metal oxides, metal nitrides, metal oxynitride, metal carbides, metal oxycarbides, and/or combinations thereof combination thereof. Exemplary metals include B, Al, Si, Ti, V, Cr, Y, Zr, Nb, Mo, Sn, Hf, Ta, and W. Specific examples of materials that may be utilized in the scratch-resistant layer or coating may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof.

Throughout the disclosure, the term "low refractive index" when used with a sub-layer of the optical layer 215, includes a range from about 1.3 to about 1.7 or about 1.3 to about 1.75. Throughout the disclosure, the term "high refractive index" when used with a sub-layer of the optical layer 215 includes a range from about 1.75 to about 2.5, about 1.85 to about 2.5, or about 1.85 or more. Throughout the disclosure, the term "medium refractive index" when used with a sub-layer of the optical layer 215 includes a range from about 1.55 to about 1.8. In some instances, the ranges for low, high, and medium refractive index may overlap.

Figure 4:
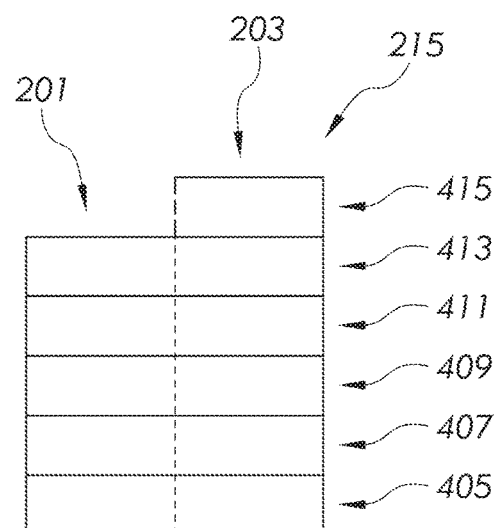
FIG. 4 is a side view of an optical layer, according to one or more embodiments.

FIG. 4 illustrates some embodiments of the optical layer 215. In some embodiments, each of the first and second portion 201, 203 is defined by a plurality of sub-layers. As shown here, the first portion 201 has five sub-layers 405, 407, 409, 411, 413 and the second portion 203 has six sub-layers 405, 407, 409, 411, 413, 415. Here, all five of the sub-layers in the first portion 201 can be identical with five of the layers in the second portion 203 in terms of thickness and refractive index. In some embodiments, the second portion 203 can be defined by one or more layers than the first portion 201. In further embodiments, as shown in FIG. 4, the second portion 201 may consist of exactly one more sub-layer than the first portion 201. Here, five of the sub-layers 405, 407, 409, 411, 413 are common to both portions.

Figure 5:
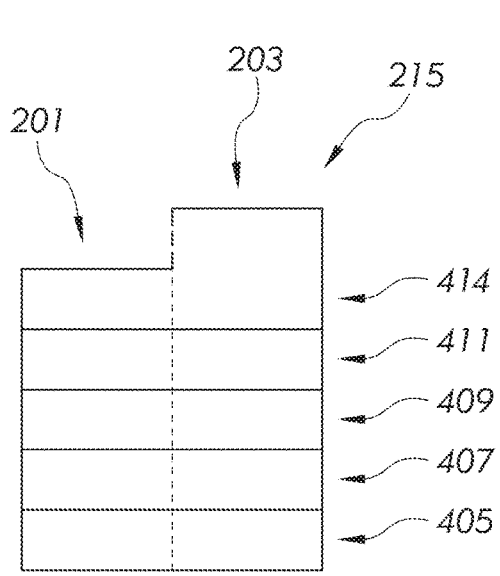
FIG. 5 is another side view of an optical layer, according to other embodiments.

FIG. 5 illustrates other embodiments of the optical layer 215. In some embodiments, each of the first and second portion 201, 203 is defined by a plurality of sub-layers. As shown here, the first portion 201 has five sub-layers 405, 407, 409, 411, 414 and the second portion 203 also has five sub-layers 405, 407, 409, 411, 414. Here, each of the five sub-layers in the first portion 201 has a corresponding layer in the second portion 203. While each of the bottom four layers in the first portion 201 can comprise the same thickness as the corresponding layer in the second portion 203, the top layer 414 in the second portion 203 is shown as being thicker than the corresponding layer in the first portion 201. In some embodiments, a difference between the thickness of a sub-layer in the second portion 203 and the corresponding sub-layer in the first portion 201 can be about 1 nm or more, about 5 nm or more, about 10 nm or more, about 20 nm or more, about 50 nm or more, about 100 nm or more, about 200 nm or more, about 4 µm or less, about 2 µm or less, about 1 µm or less. In some embodiments, the difference between the thickness of a sub-layer in the second portion 203 and the corresponding sub-layer in the first portion 201 can be within a range from about 1 nm to about 4 µm, from about 1 nm to about 2 µm, from about 1 nm to about 1 µm, from about 10 nm to about 4 µm, from about 10 nm to about 2 µm, from about 10 nm to about 1 µm, from about 20 nm to about 4 µm, from about 20 nm to about 2 µm, from about 20 nm to about 1 µm, from about 50 nm to about 2 µm, from about 50 nm to about 1 µm, from about 100 nm to about 2 µm, from about 100 nm to about 1 µm, or from about 200 nm to about 1 µm.

In some embodiments, a refractive index of one sub-layer may be different from the refractive index of an adjacent sub-layer. This difference may be about 0.01 or greater, about 0.05 or greater, about 0.1 or greater, or even about 0.2 or greater, from about 0.01 to about 3.0, from about 0.01 to about 2.0, from about 0.01 to about 1.0, from about 0.01 to about 0.5, from about 0.01 to about 0.2, from about 0.1 to about 3.0, from about 0.1 to about 2.0, from about 0.1 to about 1.0, from about 0.1 to about 0.5, from about 0.2 to about 3.0, from about 0.2 to about 2.0, or from about 0.2 to about 1.0. A pair of adjacent sub-layers having a difference in refractive index, as described above, can define a set of sub-layers. In some embodiments, the second portion 203 may have 1 set of sub-layers. In other embodiments, the second portion 203 may have 10 or more sets of sub-layers. In still other embodiments, either or both of the first portion 201 and second portion 203 may comprise a sub-layer with a third refractive index that is different from the refractive index of the sub-layers defining a set of sub-layers. Such a sub-layer with a third refractive index may be at the first major surface or the second major surface of the corresponding portion of the optical layer 215. This third refractive index may be greater than the refractive index of each of the first and second sub-layers, it may be between the refractive index of the first sub-layer and the refractive index of the second sub-layer, or it may be less than the refractive index of each of the first and second sub-layers.

Materials suitable for use as a lower refractive index sub-layer in the optical layer 215 include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of such materials may be minimized (e.g., using $Al_2O_3$ and $MgAl_2O_4$). In some embodiments, the lower refractive index sub-layer may have a refractive index of about 1.7 or less.

In some embodiments, it may be useful to minimize the thickness of material with a refractive index less of about 1.7 or less in a given portion of the optical layer 215, for example, a portion of the optical layer 215 above any scratch-resistant layer. Without being bound by theory, the lower refractive index materials are typically also lower-hardness materials, owing to the nature of atomic bonding and electron densities that simultaneously affect refractive index and hardness. Thus, it is desirable to minimize the amount of lower refractive index material present, particularly in a portion of the stack above the scratch-resistant layer, but some amount of lower refractive index material is typically desired to efficiently tailor reflection and color targets for each portion of the optical layer 215. It can be useful to quantify both the total amount of lower refractive index material in the entire surface coating 105 as well. The thickest high-hardness layer in the surface coating 105 protects the layers closer to the transparent layer 103 from scratch and damage, meaning that the lower refractive index layers closer to the first major surface 111 of the article than thickest high-hardness layer are most susceptible to scratch and other types of damage.

Materials suitable for use as a higher refractive index sub-layer in the optical layer 215 include $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$, and diamond-like carbon. The oxygen content of such materials may be minimized, especially in $SiN_x$ or $AlN_x$ materials. In some cases, the higher refractive index materials may be deposited as thick sub-layer that can be characterized as a scratch-resistant layer with a thickness from about 500 nm to about 2000 nm. In some embodiments, the higher refractive index sub-layer may have a refractive index of about 1.7 or more.

The compatibility of adjacent layers is desirable so that the resulting article maintains the claimed mechanical properties. As such, the following materials are preferred. The sub-layer with a higher refractive index can comprise at least one of $Si_uAl_vO_xN_y$, AlN, $Si_3N_4$, $AlO_xN_y$, $SiO_xN_y$, $ZrO_2$, or $Al_2O_3$. Likewise, the sub-layer with a lower refractive index can comprise at least one of $SiO_2$, $Al_2O_3$, SiO, $AlO_xN_y$, $SiO_xN_y$, or $Si_uAl_vO_xN_y$. It has been found that $AlO_xN_y$, $Si_vO_xN_y$, and $Si_uAl_vO_xN_y$ based compositions can be substantially interchangeable in the optical designs disclosed here, when properly tuned to achieve the desired combinations of hardness, refractive index, film stress, and low optical absorption. $AlO_xN_y$ materials may be considered to be oxygen-doped AlNx, that is they may have an AlNx crystal structure (e.g. wurtzite) and need not have an AlON crystal structure. Exemplary preferred $AlO_xN_y$ higher refractive index materials may comprise from about 0 atom % to about 20 atom % oxygen, or from about 5 atom % to about 15 atom % oxygen, while including 30 atom % to about 50 atom % nitrogen. Exemplary preferred $Si_uAl_vO_xN_y$ higher refractive index materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight.

In one or more embodiments, the optical characteristics of the second portion 203 relative to the optical characteristics of the first portion 201 can be controlled by adjusting the optical thickness of the additional sub-layer 415 or sub-layers in the second portion 203. As used herein, the term "optical thickness" is determined by (n*d), where "n" refers to the refractive index of the sub-layer and "d" refers to the physical thickness of the sub-layer. In one or more embodiments, at least one of the sub-layers of the optical layer 215 may include an optical thickness in the range from about 2 nm to about 200 nm, from about 10 nm to about 100 nm, from about 15 nm to about 100 nm, from about 15 to about 500 nm, or from about 15 to about 5000 nm.

In some embodiments, the first portion 201 or the second portion 201 of the optical layer 215 may have an area of about 100 μm$^2$ or more. In other embodiments, the first portion 201 or the second portion 203 of the optical layer 215 may have an area of about 5 cm$^2$ or less. In some embodiments, an area of both the first portion 201 and the second portion 203 may be about 5 cm$^2$ or less. In some embodiments, the first portion 201 and second portion 203 can be patterned to convey information, for example a trademark or a logo. The patterning of the first portion 201 and second portion 203 can be such that the patterned shapes are complementary to one another, meaning that one portion covers the area adjacent and contiguous to the other portion. The visibility of a reflected pattern may be related to the levels of ambient illumination or the absorption of the transparent layer 103. For example, on the exterior side of a sunglasses article, there can be high ambient illumination, and sunglasses will absorb light. As such, a surface coating comprising an optical layer 215 on the exterior surface of the sunglasses can have a distinctive and highly visible pattern, while a user viewing from the opposite side of the sunglasses may not notice any visible reflectance. A similar scenario can be achieved when there is a mismatch between the exterior light levels and the interior light levels (e.g., vehicle windows, building windows), with or without optical absorption incorporated into the coatings or substrate of the article.

Throughout the disclosure, the optical layer 215, surface coating 105, 206, 306 and the article 100, 200, 300 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting the first major surface 111 of the article 100, 200, 300, which may be the first major surface of the optical layer 215 and the surface coating 105, 206, 306, with the diamond Berkovich indenter to form an indent to an indentation depth in the range from about 100 nm to about 1000 nm and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness, and not an average hardness. Unless otherwise specified, hardness values provided herein refer to values measured by the Berkovich Indenter Hardness Test.

Typically, in nanoindentation measurement methods (e.g., using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths about 10% or more of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the surface coating thickness.

Measured hardness values may be exhibited along an indentation depth of 100 nm or greater (e.g., from about 100 nm to about 300 nm, from about 100 nm to about 400 nm, from about 100 nm to about 500 nm, from about 200 nm to about 300 nm, from about 200 nm to about 400 nm, or from about 200 nm to about 500 nm). In some embodiments, the article 100, 200, 300 may exhibit a hardness about 10 GPa or more, about 12 GPa or more, about 14 GPa or more, about 16 GPa or more, or about 20 GPa or more along an indentation path from about 100 nm to about 500 nm, i.e., all values of hardness (measured from 100 nm to 500 nm indentation depth) will be the stated value or more (for example 10 GPa), even though the maximum hardness may be higher still.

Maximum hardness is the highest hardness value measured over a range of indentation depths. Such maximum hardness values are exhibited along an indentation depth of about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). The article 100, 200, 300 may exhibit a maximum hardness in the range from about 12 GPa to about 50 GPa, or about 12 GPa to about 25 GPa, as measured by the Berkovich Indenter Hardness Test on the first major surface 111 of the article. In one or more embodiments, the article 100, 200, 300 exhibits a maximum hardness in the range from about 10 GPa to about 50 GPa as measured by the Berkovich Indenter Hardness Test. In one or more embodiments, the article exhibits a maximum hardness in the range from about 10 GPa to about 30 GPa, from about 12 GPa to about 30 GPa, from about 14 GPa to about 30 GPa, from about 10 GPa to about 28 GPa, from about 10 GPa to about 26 GPa, from about 10 GPa to about 24 GPa, from about 10 GPa to about 22 GPa, from about 10 GPa to about 20 GPa, from about 12 GPa to about 25 GPa, from about 15 GPa to about 25 GPa, from about 16 GPa to about 24 GPa, from about 18 GPa to about 22 GPa and all ranges and sub-ranges therebetween. In one or more embodiments, the article 100, 200, 300 may exhibit a maximum hardness that is about 15 GPa or more, about 20 GPa or more, or about 25 GPa or more. In one or more embodiments, the article 100, 200, 300 exhibits a maximum hardness in the range from about 10 GPa to about 50 GPa, from about 12 GPa to about 50 GPa, from 14 GPa to about 50 GPa, from about 16 GPa to about 50 GPa, or from about 18 GPa to about 50 GPa.

The hardness of the article 100, 200, 300 can be measured in a first portion of the article 100, 200, 300 associated with the first portion 201 of the optical layer 215 and in a second portion of the article 100, 200, 300 associated with the second portion 203 of the optical layer 215. In some embodiments, the first and second portions of the article 100, 200, 300 both exhibit a maximum hardness measured from about 10 GPa to about 50 GPa, from about 12 GPa to about 50 GPa, from about 14 GPa to about 50 GPa, and from about 16 GPa to about 30 GPa for indentations from about 100 nm to about 500 nm. In other embodiments, the first and second portions of the article both exhibit a maximum hardness measured from about 10 GPa to about 50 GPa, from about 14 GPa to about 50 GPa, and from about 16 GPa to about 30 GPa for an indentation depth from about 100 nm to about 500 nm.

The composition of the surface coating 105, 206, 306, including any scratch-resistant layer and the optical layer 215, may be modified to provide specific mechanical properties. As such, the transparent layer 103 of one or more embodiments may have a hardness that is less than the hardness of the article 100, 200, 300 (as measured by the Berkovich Indenter Hardness Test). The hardness of the transparent layer 103 may be measured using known methods in the art, including but not limited to the Berkovich Indenter Hardness Test.

Figure 18:
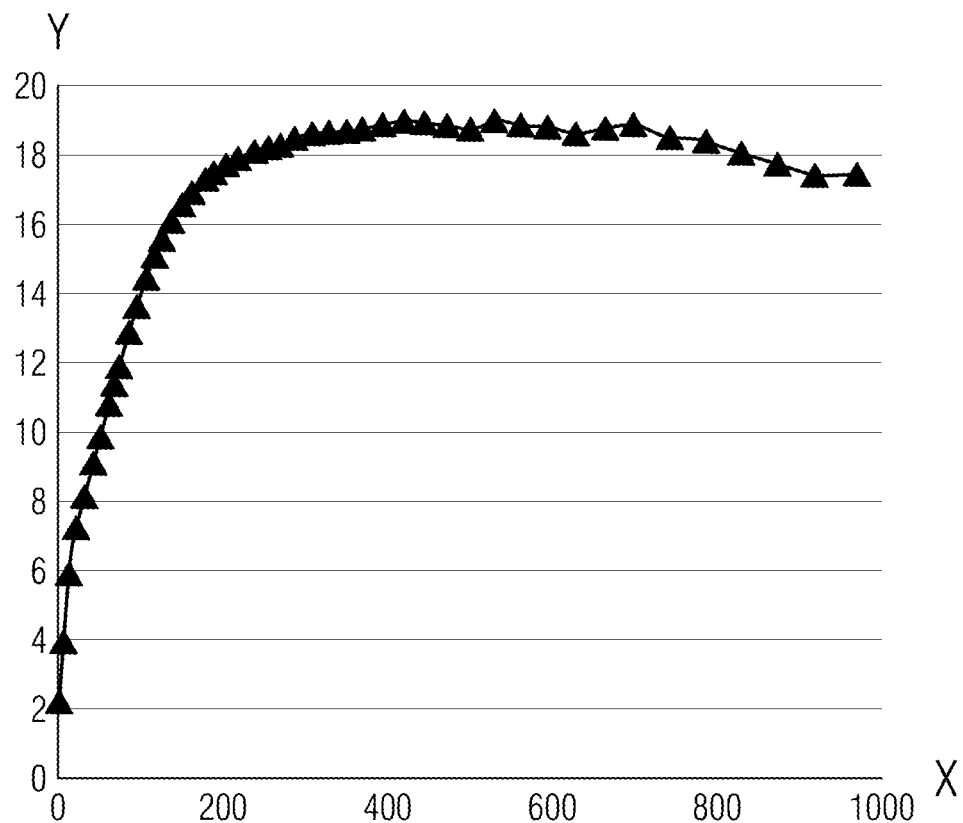
FIG. 18 shows an example hardness plot.

FIG. 18 illustrates the changes in measured hardness value as a function of indentation depth for some examples.

The x-axis or the horizontal axis is the indentation depth in nanometers (nm) while the y-axis or the vertical axis is the hardness in Gigapascals (GPa). In some embodiments, as shown in FIG. 18, a first curve based on measurements in a first portion of the article 100, 200, 300 associated with the first portion 201 of the optical layer 215 may superimpose with a second curve based on measurements in a second portion of the article 100, 200, 300 associated with the second portion 203 of the optical layer 215. In some embodiments, a difference in hardness values between a first measurement in a first portion of the article 100, 200, 300 associated with the first portion 201 of the optical layer 215 and a second measurement in a second portion of the article 100, 200, 300 associated with the second portion 203 of the optical layer 215 at the same indentation depth are small relative to the magnitude of both the first measurement and the second measurement. In some embodiments, the difference between the first measurement in a first portion of the article 100, 200, 300 associated with the first portion 201 of the optical layer 215 and the second measurement in the second portion of the article 100, 200, 300 associated with the second portion 203 of the optical layer 215 at the same indentation depth may be about 10% or less, about 5% or less, about 2% or less, or about 1% or less. As shown in FIG. 18, the hardness measured at intermediate indentation depths (at which hardness approaches and is maintained at maximum levels) and at deeper indentation depths depends on the thickness of a material or layer. The hardness of each layer was measured using the Berkovich Indenter Hardness Test. The article tested exhibited a maximum hardness at indentation depths from about 100 nm to about 600 nm that is about 10 GPa or more, for example, about 12 GPa or more, about 14 GPa or more, about 16 GPa or more, or about 18 GPa or more.

Throughout the disclosure, the article 100, 200, 300 of one or more embodiments may be described as abrasion-resistant as measured by various methods, after being abraded on the first major surface 111 according to a Taber Test after about 500 cycles or more. Various forms of abrasion test are known in the art, for example the test method specified in ASTM D1044-99, using abrasive media supplied by Taber Industries. Modified abrasion methods related to ASTM D1044-99 can be created using different types of abrading media, abradant geometry and motion, pressure, etc. in order to provide repeatable and measurable abrasion or wear tracks to meaningfully differentiate the abrasion resistance of different samples. For example, different test conditions will usually be appropriate for soft plastics as opposed to hard inorganic test samples. The embodiments described herein were subjected to a Taber Test, as defined herein, which is a specific modified version of ASTM D1044-99 that gives clear and repeatable differentiation of durability between different samples which comprise primarily hard inorganic materials, for example oxide glasses and oxide or nitride coatings. As used herein, the phrase "Taber Test" refers to a test method using a Taber Linear Abraser 5750 (TLA 5750) and accessories supplied by Taber Industries, in an environment including a temperature of about 22° C.±3° C. and Relative Humidity of up to about 70%. The TLA 5750 includes a CS-17 abraser material having a 6.7 mm diameter abraser head. Each sample was abraded according to the Taber Test and the abrasive damage was evaluated using both Haze and Bidirectional Transmittance Distribution Function (CCBTDF) measurements, among other methods. In the Taber Test, the procedure for abrading each sample includes placing the TLA 5750 and a flat sample support on a rigid, flat surface and securing the TLA 5750 and the sample support to the surface. Before each sample is abraded under the Taber Test, the abraser is refaced using a new S-14 refacing strip adhered to glass. The abraser is subjected to 10 refacing cycles using a cycle speed of 25 cycles/minute and stroke length of 1 inch, with no additional weight added (i.e., a total weight of about 350 g is used during refacing, which is the combined weight of the spindle and collet holding the abraser). The procedure then includes operating the TLA 5750 to abrade the sample, where the sample is placed in the sample support in contact with the abraser head and supporting the weight applied to the abraser head, using a cycle speed of 25 cycles/minute, and a stroke length of 1 inch, and a weight such that the total weight applied to the sample is 850 g (i.e., a 500 g auxiliary weight is applied in addition to the 350 g combined weight of the spindle and collet). The procedure includes forming two wear tracks on each sample for repeatability and abrading each sample for 500 cycle counts in each of the two wear tracks on each sample.

In one or more embodiments, the first major surface 111 of the article 100, 200, 300 is abraded according to the above Taber Test and the article exhibits a haze of about 10% of less, about 5% or less, about 4% or less, about 3% or less, about 2% or less, about 1% or less, about 0.5% or less or about 0.3% or less. Unless otherwise indicated, all haze measurements were performed on the abraded side (i.e., the first major surface 111) of the article 1000 using a haze meter supplied by BYK Gardner under the trademark Haze-Guard Plus®, using an aperture over the source port, where the aperture has a diameter of 8 mm.

Alternate methods for quantifying the abrasion resistance are also contemplated here. In one or more embodiments, article 100, 200, 300 is abraded by the Taber Test on the first major surface 111 may exhibit an abrasion resistance as measured by atomic force microscopy (AFM) surface profiling of an 80 µm by 80 µm test area of an abraded portion of the first major surface 111. From an AFM surface scan, surface roughness statistics like RMS roughness, Ra roughness, and peak-to-valley surface height may be evaluated. The Ra surface roughness is an arithmetical mean of the absolute deviations of a surface profile from an average position in a direction normal to the surface of the test area. Unless otherwise indicated, all surface roughness values are the measured average roughness (Ra) for an 80 µm by 80 µm area of an abraded portion of the first major surface 111 of the article 100. In one or more embodiments, the measured average roughness (Ra) values may about 25 nm or less, about 12 nm or less, about 10 nm or less, or about 5 nm or less, after being abraded under the Taber Test described above.

In one or more embodiments, the article 100, 200, 300 may exhibit an abrasion resistance, after the first major surface 111 is abraded by the Taber Test as measured by a light scattering measurement. The light scattering measurement includes a bi-directional transmittance distribution function (BTDF) measurement carried out using a Radiant Zemax IS-SA™ instrument. This instrument has the flexibility to measure light scattering using any input angle from normal to about 85 degrees incidence in reflection, and from normal to about 85 degrees incidence in transmission, while also capturing all scattered light output in either reflection or transmission into $2\pi$ steradians (a full hemisphere in reflection or transmission). In some embodiments, the article 100, 200, 300 exhibits an abrasion resistance, as measured using BTDF at normal incidence and analyzing the transmitted scattered light at a selected angular range, for example from about 10 degrees to about 80 degrees in polar angles and any angular range therein. The full azimuthal range of angles can be analyzed and integrated, or particular azimuthal angular slices can be selected, for example from about 0 degrees to about 90 degrees azimuthally. In the case of linear abrasion, it may be desired to choose an azimuthal direction that is substantially orthogonal to the abrasion direction so as to increase signal-to-noise of the optical scattering measurement. Unless otherwise indicated, all light scattering intensities reported are based on a BDTF measurement evaluated at a specified polar scattering angle (e.g., about 20 degrees, about 40 degrees) carried out using the Radiant Zemax IS-SA tool in CCBTDF mode at normal incidence in transmission with a 2 mm aperture and a monochromoter set to 600 nm wavelength. In one or more embodiments, the article 100, 200, 300 may exhibit a scattered light intensity of about 0.1 or less, about 0.05 or less, about 0.03 or less, about 0.02 or less, about 0.01 or less, about 0.005 or less, or about 0.003 or less (in units of 1/steradian) when evaluated at polar scattering angles in the range from about 15 degrees to about 60 degrees (e.g., about 20 degrees, about 40 degrees).

Throughout the disclosure, color from a portion of the optical layer 215 can be generated from optical interference between reflected waves from the interface at the first major surface 111 of the article 100, the interface between the optical layer 215 and the outer layer 213 or inner layer 309, and the interface between different sub-layer's in a portion of the optical layer 215. As used herein, the term "transmittance" is defined as the percentage of incident optical power within a given wavelength range transmitted through a material (e.g., the article 100, 200, 300, the transparent layer 103). The term "reflectance" is similarly defined as the percentage of incident optical power within a given wavelength range that is reflected from a material (e.g., the article 100, 200, 300, the first portion 201 of the optical layer 215, the second portion 203 of the optical layer 215). Transmittance and reflectance are measured using a specific linewidth. In one or more embodiments, the spectral resolution of the characterization of the transmittance and reflectance is less than 5 nm or 0.02 eV. The color may be more pronounced in reflection. The angular color shifts in reflection with viewing angle due to a shift in the spectral reflectance oscillations with incident illumination angle.

The distinctive optical characteristics exhibited are a result of the differences between the first portion 201 and second portion 203 of the optical layer 215. Observed color and angular color shifts with incident illumination angle are can be useful for catching the attention of a potential viewer. Likewise, different colors exhibited by portions of an article in close proximity, especially for a wide range of viewing angle, can be used to convey a message. Additionally, different reflectance values can create a distinctive impression on viewers.

The first portion 201 and second portion 203 of the optical layer 215 can have either similar average reflectance values or different average reflectance values. In some embodiments, the article of one or more embodiments, or portions of the article 100, 200, 300 associated with the first portion 201 and the second portion 203 of the optical layer 215 may exhibit a specified difference in the average reflectance over 400 nm-700 nm optical wavelengths. These average reflectance values may be exhibited at incident illumination angles in the range from about 0 degrees to about 20 degrees, from about 0 degrees to about 40 degrees, or from about 0 degrees to about 60 degrees.

Alternatively, the photopic reflectance could be used to characterize the average reflectance value of each portion. Photopic reflectance mimics the response of the human eye by weighting the reflectance versus wavelength spectrum according to the human eye's sensitivity. Photopic reflectance may also be defined as the luminance, or tristimulus Y value of reflected light, according to known conventions, for example CIE color space conventions. The average photopic reflectance is defined as an integral over visible wavelengths (e.g., 380 nm to 720 nm) for the product of the spectral reflectance, the illuminant spectrum, and the CIE's color matching function that is related to the eye's spectral response. Throughout the disclosure, all average reflectance values and all average transmittance values are photopic averages.

In some embodiments, the absolute value of the difference between the average reflectance of the portions is large, namely about 5% or more. In other embodiments, the absolute value of the difference is not large, but the portions have different color properties.

As used herein, a "near normal" incidence angle means an incidence angle that is 10 degrees or less from normal incidence. "Near normal" includes normal. When a transmission or reflection criteria is described as occurring at a "near normal" angle, the criterion is met if the specified transmission or reflection criteria occurs at any near normal angle. In many cases, optical properties including reflectance, transmission and color shift due to a multi-layer interference stack do not vary much as a function of angle at near normal angles. So, "near normal" incidence and "normal" incidence are, for practical purposes, the same. In addition, some measurement techniques do not work well at exactly normal incident angles, so properties at normal incident angles are often estimated based on measurements at near normal angles. All occurrences of "normal" incidence herein should be read as including "near normal." It should be understood that unless otherwise noted, the L* coordinate of the articles described herein are the same at any angle or reference point and do not influence color shift.

The first portion 201 and second portion 203 of the optical layer 215 can have either a low color difference or a high color difference, as quantified using the CIE (L*, a*, b*) colorimetry system in reflectance. Different colors generated from a given portion of the optical layer 215 may span the color palette from red, orange, gold (yellow), green, blue, to purple. In some embodiments, the colors of a portion may shift with angle across multiple colors. In other embodiments, the color of a portion will be bounded in a certain range in a* and b* with angle of incidence. A "high color" coating, may still preferably have a restriction on its color with viewing angle in some embodiments. For example, a 'green' coating may have an a* of about 5 or less or about 1 or less for all viewing angles from about 0 degrees to about 90 degrees or from about 0 degrees to about 60 degrees. A 'blue' or 'blue-green' coating may have a b* of about 5 or less or about 1 or less for all viewing angles from about 0 degrees to about 90 degrees or from about 0 degrees to about 60 degrees. A 'red' or 'orange' or 'purple' coating may have an a* of about −5 or more or about −1 or more for all viewing angles from about 0 degrees to about 90 degrees or from about 0 degrees to about 60 degrees. A 'gold' coating may have a b* of about −5 or more or about −1 or more for all viewing angles from about 0 degrees to about 90 degrees or from about 0 degrees to about 60 degrees. These constraints can be combined with one another to create a designed color in a high-color coating, for example a "blue-green" coating may combine the constraints of a b* of about 5 or less and an a* of about 5 or less for all viewing angles from about 0 degrees to about 90 degrees or from about 0 degrees to about 60 degrees. A "red-gold" coating may combine the constraints of a b* of about −5 or more and an a* of about −5 or more for all viewing angles from about 0 degrees to about 90 degrees or from about 0 degrees to about 60 degrees. Other color combinations and constraints are possible.

Portions of the article 100, 200, 300 may exhibit different colors in reflectance, when viewed at the same and different incident illumination angles, under an illuminant. For example, the relevant color difference may be determined using the expression $\sqrt{(a^*_2-a^*_1)^2+(b^*_2-b^*_1)^2}$, where $a^*_1$ and $b^*_1$ represent the CIE color coordinates of the first portion viewed at a viewing angle and $a^*_2$ and $b^*_2$ represent the CIE color coordinates of the second portion viewed at the same viewing angle. In some embodiments, the color difference can be about 4 or more for at least one viewing angle. In other embodiments, the color shift can be about 12 or more for at least one viewing angle. Yet, in other embodiments, the color shift can be about 4 or less while the difference in reflectance between the portions is large or the portion can have an angular color shift.

Alternatively, at least one portion of the article may exhibit a different color relative to a neutral color, defined by the CIE color coordinates (a*=0, b*=0). For example, the relevant color difference may be determined by $\sqrt{(a^*_{article})^2+(b^*_{article})^2}$, where $a^*_{article}$ and $b^*_{article}$ represent the CIE color coordinates of a portion of the article viewed at a viewing angle. In some embodiments, the color difference may be about 4 or more for at least one viewing angle. In other embodiments, the color shift may be about 12 or more for at least one viewing angle. Yet, in other embodiments, the color difference may be about 4 or less for all viewing angles while the difference in reflectance between the portions is large or the other portion exhibits a large color shift.

In one or more embodiments, a portion of the article exhibits an angular color shift in reflectance. When this angular color shift is relative to that portion viewed at a reference angle, the color shift may be determined by $\sqrt{(a^*_{article}-a^*_{ref})^2+(b^*_{article}-b^*_{ref})^2}$, where $a^*_{article}$ and $b^*_{article}$ represent the CIE color coordinates of a portion of the article viewed at a viewing angle and $a^*_{ref}$ and $b^*_{ref}$ represent the CIE color coordinates of a portion of the article viewed at a reference angle (e.g., normal incidence). In some embodiments, the color shift can be about 4 or more for at least one viewing angle. In other embodiments, the color shift can be about 12 or more for at least one viewing angle. Yet, in other embodiments, the color shift can be about 4 or less while the difference in reflectance between the portions is large or the portion has color difference relative to another portion.

Alternatively, the color shift may be defined relative to a color difference exhibited between the portions when viewed at a reference angle. In this case, the color shift may be determined by $\sqrt{((a^*_2-a^*_{2,ref}-a^*_1+a^*_{1,ref})^2+(b^*_2-b^*_{2,ref}-b^*_1+b^*_{1,ref})^2}$, where $a^*_1$ and $b^*_1$ representing the CIE color coordinates of the first portion viewed at a viewing angle, $a^*_2$ and $b^*_2$ representing the CIE color coordinates of the second portion at the same viewing angle, $a^*_{1,ref}$ and $b^*_{1,ref}$ representing the CIE color coordinates of the first portion viewed at a reference viewing angle and angle of illumination, and $a^*_{2,ref}$ and $b^*_{2,ref}$ representing the CIE color coordinates of the second portion viewed at the same reference viewing angle.

The reference illumination angle may include normal incidence (i.e., from about 0 degrees to about 10 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 50 degrees from normal incidence, 55 degrees from normal incidence, or 60 degrees from normal incidence, provided the difference between the incident illumination angle and the reference illumination angle may be about 1 degree or more, for example, about 2 degrees or about 5 degrees. The incident illumination angle may be, with respect to the reference illumination angle, in the range from about 5 degrees to about 80 degrees, from about 5 degrees to about 70 degrees, from about 5 degrees to about 60 degrees, from about 5 degrees to about 50 degrees, from about 5 degrees to about 40 degrees, from about 5 degrees to about 30 degrees, from about 5 degrees to about 20 degrees, from about 5 degrees to about 15 degrees, and all ranges and sub-ranges therebetween, away from the reference illumination angle. The article may exhibit the angular color shifts in reflectance described herein at and along all the incident illumination angles in the range from about 2 degrees to about 80 degrees (or from about 10 degrees to about 80 degrees), when the reference illumination angle is normal incidence. In some embodiments, the article may exhibit the angular color shifts in reflectance described herein at and along all the incident illumination angles in the range from about 2 degrees to about 80 degrees (or from about 10 degrees to about 80 degrees), when the difference between the incident illumination angle and the reference illumination angle may be about 1 degree or more, for example about 2 degrees or about 5 degrees.

In some embodiments, the angular color shift may be measured at all angles between a reference illumination angle (e.g., normal incidence) and an incident illumination angle in the range from about 20 degrees to about 80 degrees. In other words, the angular color shift may be measured and may be about 5 or less or about 2 or less, at all angles within a range from about 0 degrees and 20 degrees, from about 0 degrees to about 30 degrees, from about 0 degrees to about 40 degrees, from about 0 degrees to about 50 degrees, from about 0 degrees to about 60 degrees or from about 0 degrees to about 80 degrees.

In one or more embodiments, the article exhibits a color in the CIE L*, a*, b* colorimetry system in reflectance and/or transmittance such that the distance or reference point color shift between the transmittance color or reflectance coordinates from a reference point may be as specified under an illuminant (which can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting)). In specific examples, the articles exhibit a specified color shift in reflectance and/or transmittance when viewed at incident illumination angle from the reference illumination angle under a CIE F2, F10, F11, F12 or D65 illuminant or more specifically under a CIE F2 illuminant. Stated another way, the article may exhibit a transmittance color (or transmittance color coordinates) and/or a reflectance color (or reflectance color coordinates) measured at the outer surface 122 having a specified reference point color shift from a reference point, as defined herein. Unless otherwise noted, the reflectance color and reflectance color coordinates are measured at the first major surface 111 of the article 100, 200, 300 under a D series illuminant.

In some embodiments, a portion of the article 100, 200, 300 may exhibit an a* value in reflectance that can be different from another portion of the article by about 4 or more or about 12 or more. In other embodiments, a portion of the article 100, 200, 300 may exhibit a b* value in reflectance that can be different from another portion of the article by about 4 or more or about 12 or more.

The articles described by the various embodiments discussed can be manufactured by a variety of different methods. Due to the different structure in one portion of the optical layer 215 relative to another portion of the optical layer 215, it is not necessarily easy to manufacture such articles. Two methods of creating different portions in the same article will be discussed.

Figure 6:
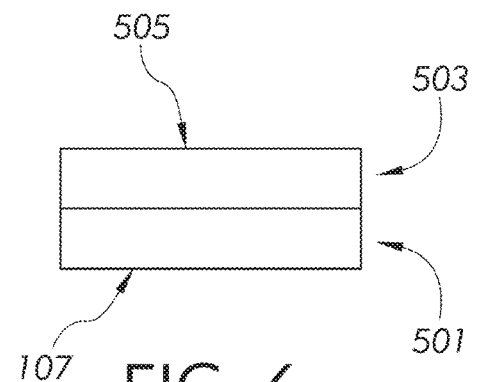
FIG. 6 schematically illustrates a step in a first method of forming an article.
Figure 7:
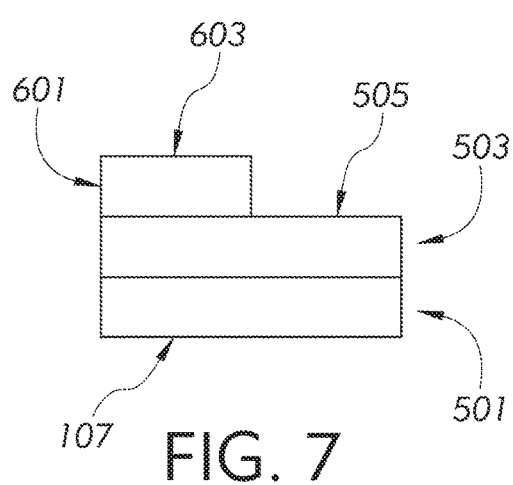
FIG. 7 schematically illustrates another step in the first method of forming an article.
Figure 8:
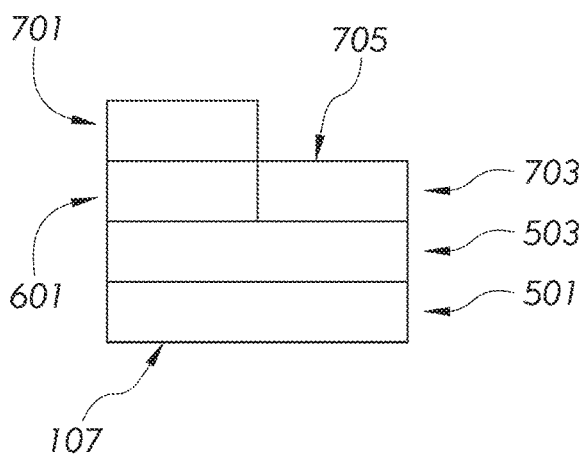
FIG. 8 schematically illustrates another step in the first method of forming an article.
Figure 9:
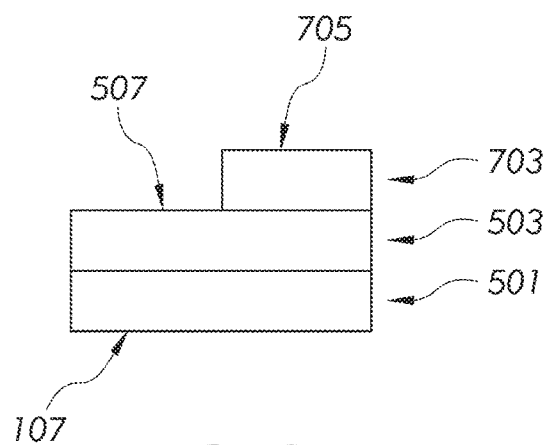
FIG. 9 schematically illustrates another step in the first method of forming an article.

In a first method, a removable mask can be used to control where a layer is deposited. FIG. 6 illustrates a first layer 503 deposited on a substrate 501. The substrate 501 may comprise the transparent layer 103 or it may additionally comprise an inner layer 309. First, a removable mask 601 can be deposited over a first portion but not a second portion of the first major surface 505 of the first layer 503, as illustrated in FIG. 7. Second, a second layer 701, 703 can be deposited on the first major surface 603 of the removable mask 601 and a second portion of the first major surface 505 of the first layer, as illustrated in FIG. 8. Third, the removable mask 601 is removed to reveal the first major surface of a first portion 507 of first layer 503, as illustrated in FIG. 9. As formed, the portion defined below the first portion 507 of the first major surface of the first layer 503 can correspond to the first portion 201 of the optical layer 215 and the other portion defined below the first major surface 705 of the second layer 703 can correspond to the second portion 203 of the optical layer 215 in FIG. 2.

In some embodiments, the removable mask 601 may comprise a material with different mechanical properties than either of the first layer 503 and the second layer 701, 703. In such embodiments, the removable mask 601 may be removed using stress modulation. In other embodiments, the removable mask 601 may have different optical properties than either of the first layer 503 and the second layer 701, 703. In such embodiments, the removable mask 601 may be subject to localized heating by applying a light source at a wavelength that the mask is sensitized to. For example, the removable mask 601 may contain a dye that absorbs at the frequency of a laser or a ultra-violet (UV) light source. In embodiments, the removable mask 601 may have lower chemical or solvent resistance than either of the first layer 503 and the second layer 701, 703, and the removable mask 601 may be removed using a chemical or a solvent. In embodiments, the removable mask 601 may be a photoresist. In yet other embodiments, a mask may not need to be deposited on the first major surface 505 of the first layer 503. Instead, such embodiments may use a mask to shape the distribution of material deposited on the first major surface 505 of the first layer 503. For example, a shadow mask may be in close proximity to the first major surface 505 of the first layer 503 in order to control a vapor or chemical deposition process without the shadow mask actually contacting the first major surface 505 of the first layer 503. In yet other embodiments, a mask may not be needed at all.

Figure 10:
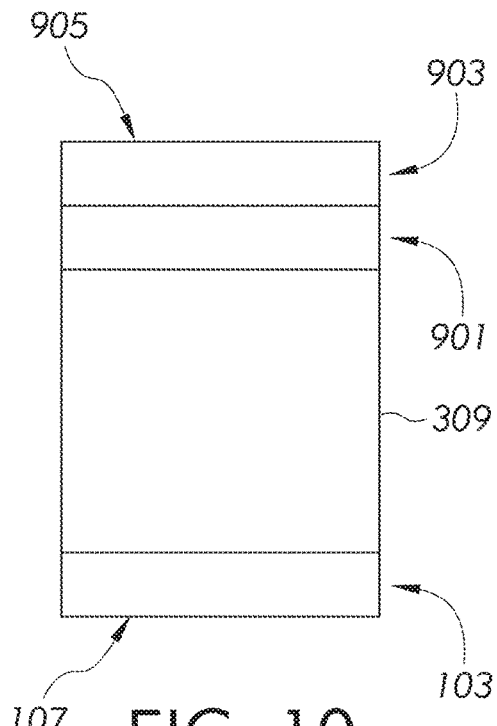
FIG. 10 schematically illustrates a step in a second method of forming an article.

In a second method, a removable mask can be used to control where a layer is removed. FIG. 10 illustrates a transparent layer 103 with an inner layer 309 deposited thereon. Additionally, a first layer 901 and a second layer 903 have been deposited on the inner layer 309, as shown, with a first major surface 905 of the second layer 903 opposite the second major surface 107 of the transparent layer 103. A removable mask 1001 can be deposited on a portion of a first major surface 905 of the second layer 903.

Figure 11:
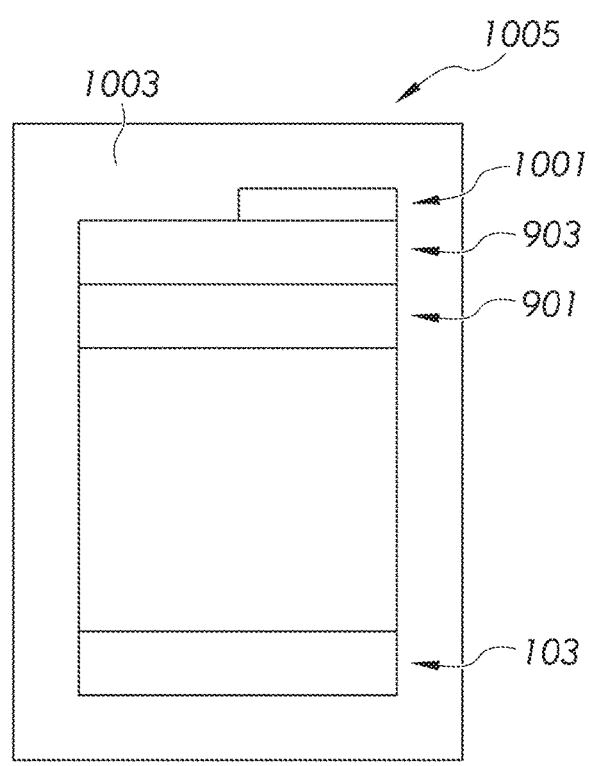
FIG. 11 schematically illustrates another step in the second method of forming an article.
Figure 12:
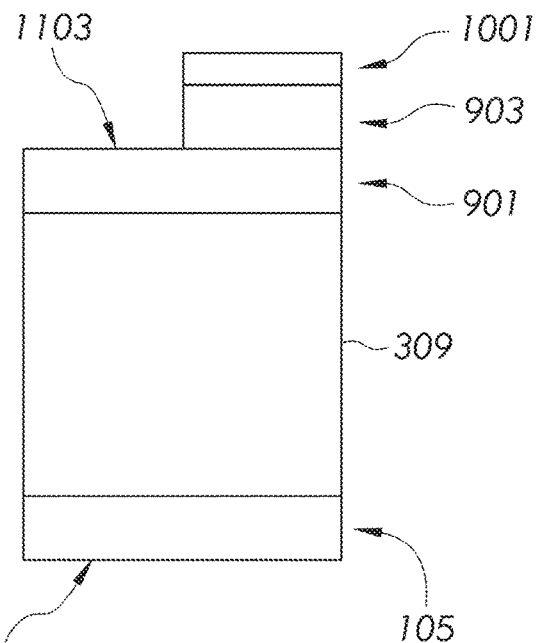
FIG. 12 schematically illustrates another step in the second method of forming an article.
Figure 13:
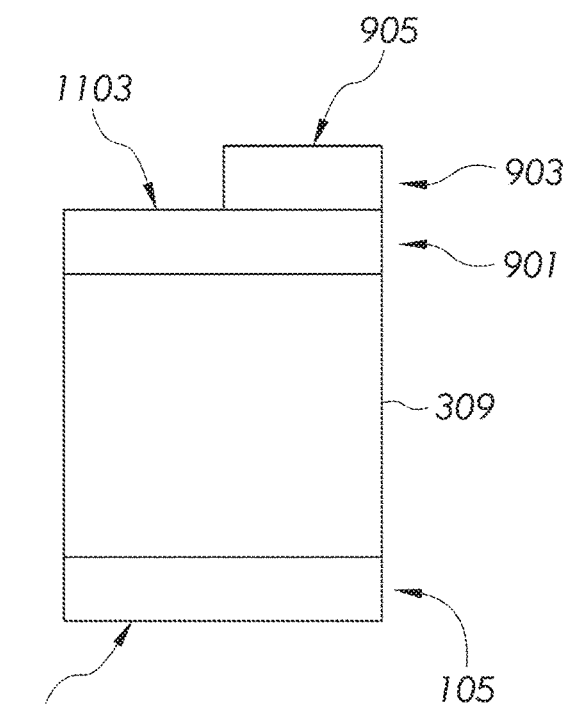
FIG. 13 schematically illustrates another step in the second method of forming an article.

As illustrated in FIG. 11, the article in its current state can be placed in a chamber 1005, where an etchant 1003 is applied. The etchant etches the exposed portion of the first major surface 905 of the second layer 903 but not the portion covered by the removable mask 1001. This exposes a portion of the first major surface 1103 of the first layer 901, as illustrated in FIG. 12. Then, the removable mask 1001 is removed to reveal the remaining portion of the second layer 903, as illustrated in FIG. 13. As formed, the portion defined below the exposed portion of the first major surface 1103 of the first layer 901 can correspond to the first portion 201 of the optical layer 215 and the other portion defined below the first major surface 905 of the second layer 903 can correspond to the second portion of the optical layer 215 in FIG. 2.

In some embodiments, the removable mask 1001 can limit the area etched by the etchant. For example, the mask may comprise a quantity of boron or polymer. In other embodiments, a mask may not need to be deposited on the first major surface 505 of the first layer 503. Instead, such embodiments may use a removable mask 1001 to shape the distribution of the etchant. In yet other embodiments, a removable mask 1001 may not be needed at all. Such embodiments may use a form of maskless lithography, for example electron beam lithography with a computer controller.

In some embodiments, the etchant may be a liquid that is effective to etch the material of the second layer 903 but not the material of the removable mask 1001 nor the first layer 901. For example, the etchant may be an acid like HF, a base like NaOH or KOH, or another compound like $NH_4HF_2$. In other embodiments, the etchant may be applied as a gas. For example, HF gas may be applied in a controlled chamber. In yet other embodiments, the etchant may be a plasma. In still other embodiments, the etchant may be generated by a light source. When the first layer 901 is etched at a much slower rate, for example an order of magnitude, or is not etched by the etchant due to the different materials that comprise the first layer 901 and the second layer 903, the first layer 901 may be referred to as an etch stop.

In embodiments where a removable mask 1001 is used, it may be removed via a number of different techniques depending on the composition of the removable mask 1001. For example, the mask may be oxidized through plasma exposure. Alternatively, the mask may be removed by ashing. Still further, a solvent, for example 1-methyl-2-pyrrolidone (NMP), may be used to remove the removable mask 1001.

In some embodiments, at least one of the first layer 901 or the second layer 903 may be deposited using a physical vapor deposition (PVD) technique, for example sputtering or evaporation. In other embodiments, it may be deposited using chemical vapor deposition (CVD). In yet other embodiments, it may be deposited with the assistance of a plasma or an ion beam.

In various embodiments of either method discussed above, the second layer 703, 903 may correspond to a single sub-layer of the optical layer 215 like the top sub-layer 415 shown in FIG. 4. In such embodiments, the first layer 503, 901 may correspond to the rest of the rest of the optical layer 215. In other embodiments, the first layer 503, 901 may not comprise any sub-layers of the optical layer 215 or the first layer 503, 901 may not be needed at all. In yet other embodiments, a third layer may be deposited after the completion of either method discussed above and that third layer may comprise addition sub-layers for the optical layer 215.

EXAMPLES

Various embodiments will be further clarified by the following examples. In these examples, it should be noted that $AlO_xN_y$, $Si_uO_xN_y$, and $Si_uAl_vO_xN_y$ were found to be substantially interchangeable as the high-index material in the modeled examples, with minor process adjustments to re-create the targeted refractive index dispersion values and layer thickness designs provided. Throughout the examples, the substrate was a glass having the nominal composition (in mol %) of: 57.5 $SiO_2$; 16 $Al_2O_3$; 17 $Na_2O$; 2.9 MgO; 0.1 $SnO_2$; and 6.5 $P_2O_5$.

Example A includes alternating layers of $AlO_xN_y$ and $SiO_2$ deposited on a glass substrate. In the first portion 201, there are 8 sub-layers between the transparent layer 103 (Substrate) and the first major surface 111 (adjacent to the Air) of the article 100, 200, 300. In the second portion 203, there are 10 sub-layers between the transparent layer 103 and the first major surface 111 of the article. As such, the second portion 203 has two more sub-layers than the first portion. The relative thicknesses of the sub-layers comprising the structure of this example are shown in Table 1.

TABLE 1

Structure of Example A

| Material | Refractive Index at 550 nm | Second Portion Thickness (nm) | First Portion Thickness (nm) |
|---|---|---|---|
| Substrate (Glass) | 1.51 | | |
| $AlO_xN_y$ | 2.006 | 8 | 8 |
| $SiO_2$ | 1.481 | 52.41 | 52.41 |
| $AlO_xN_y$ | 2.006 | 24.48 | 24.48 |
| $SiO_2$ | 1.481 | 30.12 | 30.12 |
| $AlO_xN_y$ | 2.006 | 42.63 | 42.63 |
| $SiO_2$ | 1.481 | 8.93 | 8.93 |
| $AlO_xN_y$ | 2.006 | 2000 | 2000 |
| $SiO_2$ | 1.481 | 15 | 15 |
| $AlO_xN_y$ | 2.006 | 30 | 0 |
| $SiO_2$ | 1.481 | 99 | 0 |
| Air | 1 | Air | Air |

One method of making the article of Example A comprises depositing all of the layers corresponding to the second portion for both the first and second portions, masking the second portion using a mask that contacts the surface of the second portion, etching the first $SiO_2$ layer away in the first portion using a fluorine-containing etchant such as HF or $NH_4HF_2$, etching the second layer away in the first portion (i.e., the first $AlO_xN_y$ layer) using a basic etchant such as KOH or NaOH, and then removing the mask. This method takes advantage of the fact that HF and $NH_4HF_2$ etch $SiO_2$ quickly and etch $AlO_xN_y$ slowly, and vice versa for KOH and NaOH. Alternately, another method of fabrication could involve first depositing the first 8 layers in both the first and second portions, then masking the first portion during deposition of the final two layers in the second portion, and then removing the mask. This ensures that only the second portion receives the final two layers, not the first portion.

Figure 14:
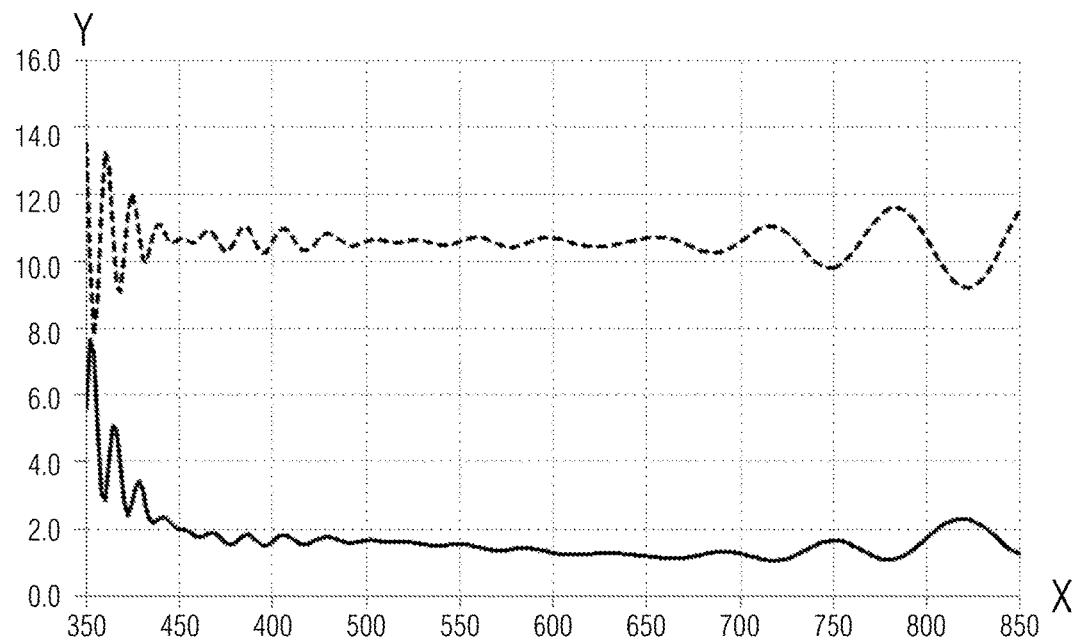
FIG. 14 shows a single-side reflection spectra for Example A.

FIG. 14 shows the single-side reflectance spectrum for the first portion 201 with the dashed line and for the second portion 203 with the solid line for this example. The x-axis or horizontal axis is wavelength in nanometers (nm) and the vertical axis is the one-sided reflectance as a percentage. Here, the first portion 201 exhibits an average reflectance of about 10.6% while the second portion 203 exhibits an average reflectance of about 1.5%. The about 9% difference in the absolute value of the average reflectance values represents a large difference because it is more than about 5%.

Figure 15:
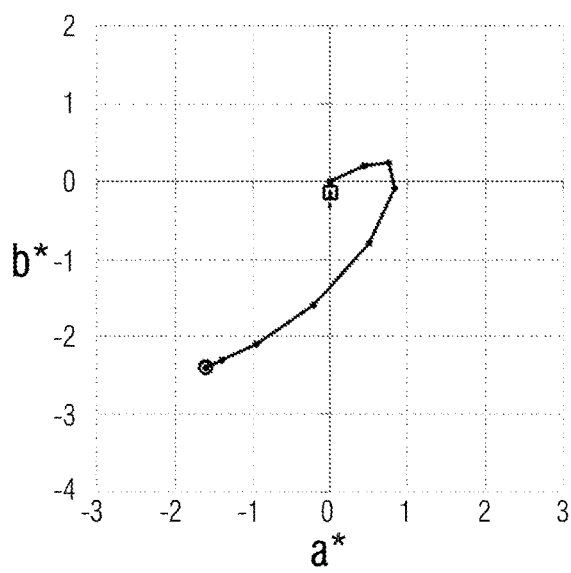
FIG. 15 shows a reflected color for Example A.

FIG. 15 shows the reflected color for the first portion 201 with the dashed line and open squares and for the second portion 203 with the solid line and the closed circles. The large open square and circle represent the color coordinates when the article is viewed at normal incidence. Each point on the curve moving away from the large open symbol represents a reading taken at about 10 degrees further from normal than the previous point. For this example, the first portion 201 exhibits substantially no color (i.e., a neutral color) relative to (a*=0, b*=0) at any angle of incidence and substantially no color shift across angles of incidence. In contrast, the second portion 203, exhibits a color difference of about 3 or less and a color shift of about 3 or less as well. As such, this is an example of some embodiments with a large difference in average reflectance but color differences and color shifts of less than 4.

Example B includes alternating layers of $SiO_2$ and $AlO_xN_y$ deposited on a glass substrate. In the first portion 201, there are 14 sub-layers between the transparent layer 103 (Substrate) and the first major surface 111 (adjacent to the Air) of the article 100, 200, 300. In the second portion 203, there are 15 sub-layers between the transparent layer 103 and the first major surface 111 of the article. As such, the second portion 203 has exactly one more sub-layer than the first portion while all of the other sub-layers of the second portion 203 correspond to layers in the first portion with the same thickness and refractive index. Consequently, the sub-layers of example B correspond to FIG. 4. The relative thicknesses of the sub-layers comprising the structure of this example are shown in Table 2.

TABLE 2

Structure of Example B

| Material | Refractive Index at 550 nm | Second Portion Thickness (nm) | First Portion Thickness (nm) |
|---|---|---|---|
| Substrate | 1.51 | | |
| $AlO_xN_y$ | 2.006 | 7.7 | 7.7 |
| $SiO_2$ | 1.481 | 52.41 | 52.41 |
| $AlO_xN_y$ | 2.006 | 24.48 | 24.48 |
| $SiO_2$ | 1.481 | 30.12 | 30.12 |
| $AlO_xN_y$ | 2.006 | 42.63 | 42.63 |
| $SiO_2$ | 1.481 | 8.93 | 8.93 |
| $AlO_xN_y$ | 2.006 | 2000 | 2000 |
| $SiO_2$ | 1.481 | 22.4 | 22.4 |
| $AlO_xN_y$ | 2.006 | 15.6 | 15.6 |
| $SiO_2$ | 1.481 | 66.1 | 66.1 |
| $AlO_xN_y$ | 2.006 | 94.9 | 94.9 |
| $SiO_2$ | 1.481 | 56.7 | 56.7 |
| $AlO_xN_y$ | 2.006 | 45 | 45 |
| $SiO_2$ | 1.481 | 63 | 63 |
| $AlO_xN_y$ | 2.006 | 48.6 | 0 |
| Air | 1 | Air | Air |

One method of making the article of Example B includes depositing all of the layers corresponding to the second portion for both portions, masking the second portion using a mask that contacts the surface of the second portion, etching the second layer away in the first portion (i.e., the first $AlO_xN_y$ layer) using a basic etchant such as KOH or NaOH, and then removing the mask. Alternately, another method of fabrication could involve first depositing the first 14 layers in both the first and second portions, then masking the first portion during deposition of the final layer in the second portion, and then removing the mask. This ensures that only the second portion receives the final layer, not the first portion.

Figure 17:
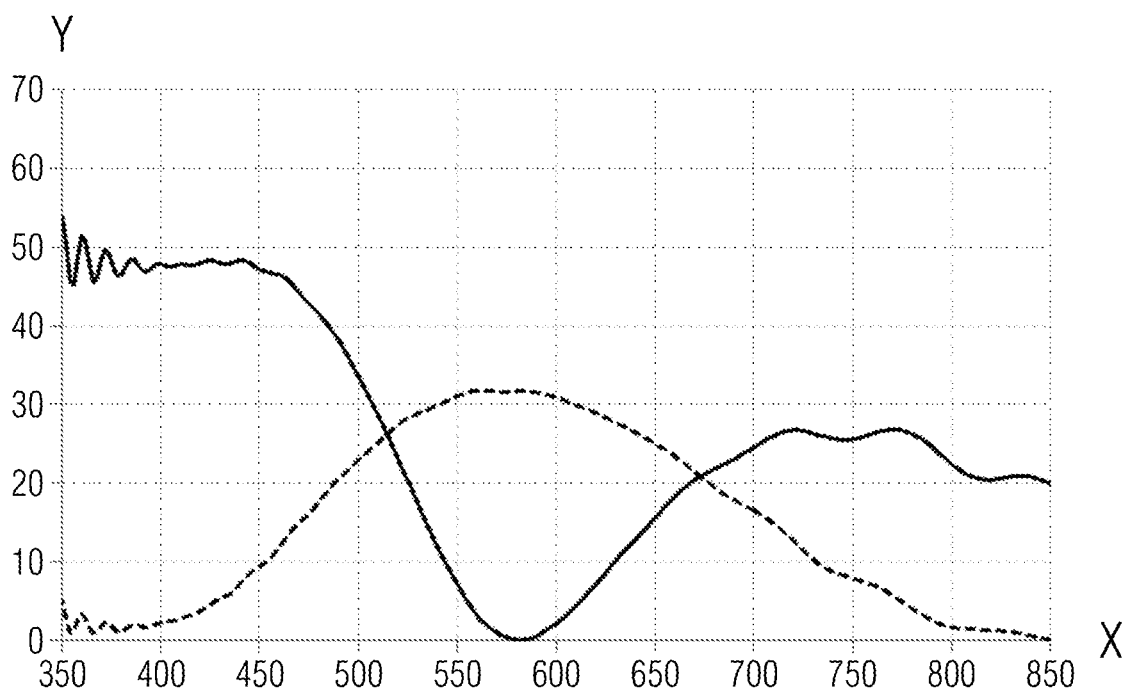
FIG. 17 shows a single-side reflection spectra for Example B.

FIG. 17 shows the single-side reflectance spectrum for the first portion 201 with the dashed line and for the second portion 203 with the solid line for this example. The x-axis or horizontal axis is wavelength in nanometers (nm) and the vertical axis is the one-sided reflectance as a percentage. Here, the first portion 201 exhibits an average reflectance of about 29% while the second portion 203 exhibits an average reflectance of about 12%. The about 17% difference in the absolute value of the average reflectance values represents a large difference because it is more than about 5%.

Figure 16:
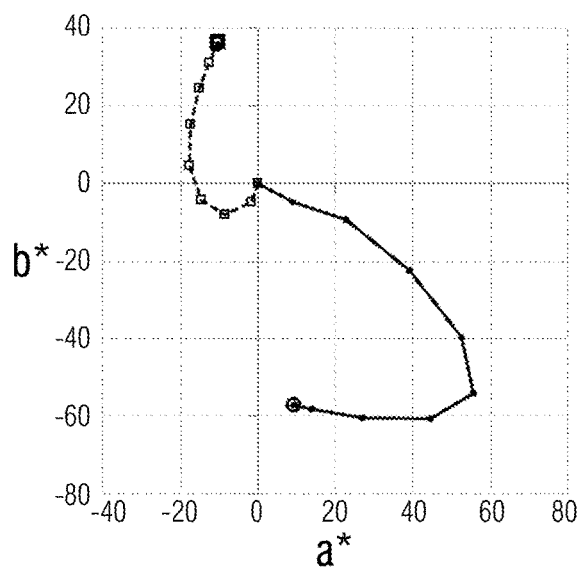
FIG. 16 shows a reflected color for Example B.

FIG. 16 shows the reflected color for the first portion 201 with the dashed line and open squares and for the second portion 203 with the solid line and the closed circles. The large open square and circle represent the color coordinates when the article is viewed at normal incidence. Each point on the curve moving away from the large open symbol represents a reading taken at about 10 degrees further from normal than the previous point. At normal incidence and relative to (a*=0, b*=0), the first portion 201 exhibits a color difference of about 35 or more while the second portion 203 exhibits a color difference of about 55 or more. Both represent large color differences. Further, the color difference of the color of the first portion 201 relative to the color of the second portion 203 is about 90 or more when both are viewed at normal incidence. This also represents a large color difference. Additionally, both portions exhibit large color shifts when viewed from normal incidence to near 90 degrees incidence, namely about 40 for the first portion 201 and about 60 for the second portion 203.

Example C includes alternating layers of $SiO_2$ and $AlO_xN_y$ deposited on a glass substrate. In the first portion 201, there are 15 sub-layers between the transparent layer 103 (Substrate) and the first major surface 111 (adjacent to the Air) of the article 100, 200, 300. In the second portion 203, there are also 15 sub-layers between the transparent layer 103 and the first major surface 111 of the article. As such, the thickness of the top sub-layer in the second portion 203 is greater than the thickness of the top-layer in the second portion by about 38.6 nm. All of the other sub-layers of the second portion 203 correspond to layers in the first portion with the same thickness and refractive index. Since the difference between the thickness of the top sub-layer of the second portion and the thickness of the corresponding sub-layer of the first portion is more than 20 nm, the sub-layers of example C correspond to FIG. 5. The relative thicknesses of the sub-layers comprising the structure of this example are shown in Table 3. The second portion of example C is identical to the second portion of Example B. This gives an example of a design that could be readily fabricated having three portions with different optical properties, using masking or etching methods similar to those described here with careful control of the final layer thickness. The three portions could correspond to Example B first portion, Example B second portion, and Example C first portion.

TABLE 3

Structure of Example C

| Material | Refractive Index at 550 nm | Second Portion Thickness (nm) | First Portion Thickness (nm) |
|---|---|---|---|
| Substrate | 1.51 | | |
| $AlO_xN_y$ | 2.006 | 7.7 | 7.7 |
| $SiO_2$ | 1.481 | 52.41 | 52.41 |
| $AlO_xN_y$ | 2.006 | 24.48 | 24.48 |
| $SiO_2$ | 1.481 | 30.12 | 30.12 |

TABLE 3-continued

Structure of Example C

| Material | Refractive Index at 550 nm | Second Portion Thickness (nm) | First Portion Thickness (nm) |
|---|---|---|---|
| $AlO_xN_y$ | 2.006 | 42.63 | 42.63 |
| $SiO_2$ | 1.481 | 8.93 | 8.93 |
| $AlO_xN_y$ | 2.006 | 2000 | 2000 |
| $SiO_2$ | 1.481 | 22.4 | 22.4 |
| $AlO_xN_y$ | 2.006 | 15.6 | 15.6 |
| $SiO_2$ | 1.481 | 66.1 | 66.1 |
| $AlO_xN_y$ | 2.006 | 94.9 | 94.9 |
| $SiO_2$ | 1.481 | 56.7 | 56.7 |
| $AlO_xN_y$ | 2.006 | 45 | 45 |
| $SiO_2$ | 1.481 | 63 | 63 |
| $AlO_xN_y$ | 2.006 | 48.6 | 10 |
| Air | 1 | Air | Air |

One method of making the article of Example C includes depositing the first 14 layers in both the first and second portions, masking the second portion during deposition of the final layer in the first portion, removing the mask, then masking the first portion during deposition of the final layer in the second portion, and removing the mask. Alternately, another method of fabrication could involve depositing the first 14 layers as well as 10 nm of the final layer in both the first and second portions, then masking the first portion during deposition of the rest of the final layer (i.e., 37.6 nm) in the second portion, and then removing the mask.

Figure 19:
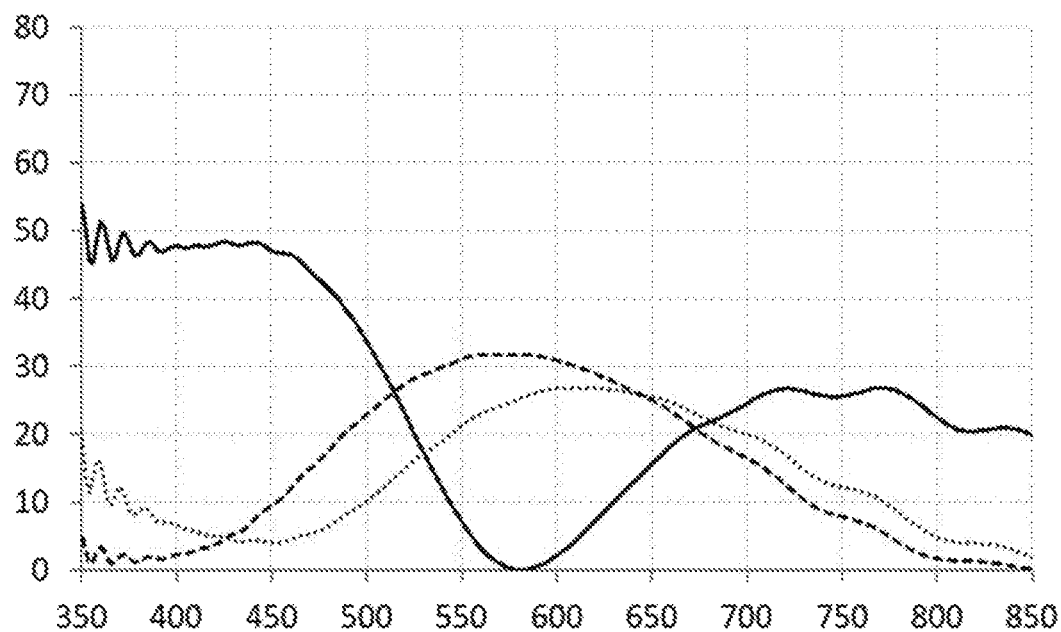
FIG. 19 shows a single-side reflection spectra for Example C.

FIG. 19 shows the single-side reflectance spectrum for the first portion 201 with the dotted line and for the second portion 203 with the solid line for this example. For comparison, the first portion from Example B is shown with the dashed line. The x-axis or horizontal axis is wavelength in nanometers (nm) and the vertical axis is the one-sided reflectance as a percentage. Here, the first portion 201 exhibits an average reflectance of about 29% while the second portion 203 exhibits an average reflectance of about 20.5%. The about 8.5% difference in the absolute value of the average reflectance values represents a large difference because it is more than about 5%.

Figure 20:
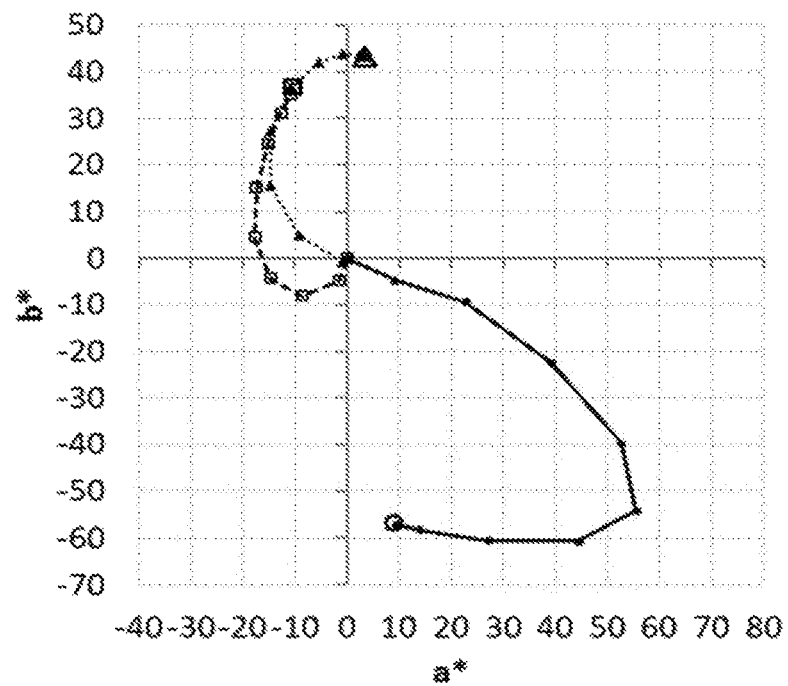
FIG. 20 shows a reflected color for Example C.

FIG. 20 shows the reflected color for the first portion 201 with the dotted line and triangles and for the second portion 203 with the solid line and the closed circles. For comparison, the first portion from Example B is shown using the dashed line and open squares. The large triangle and circle represent the color coordinates when the article is viewed at normal incidence, respectively. Each point on the curve moving away from the large open symbol represents a reading taken at about 10 degrees further from normal than the previous point. At normal incidence and relative to (a*=0, b*=0), the first portion 201 exhibits a color difference of about 40 or more while the second portion 203 exhibits a color difference of about 55 or more. Both represent large color differences. Further, the color difference of the color of the first portion 201 relative to the color of the second portion 203 is about 90 or more when both are viewed at normal incidence. This also represents a large color difference. Additionally, both portions exhibit large color shifts when viewed from normal incidence to near 90 degrees incidence, namely about 40 for the first portion 201 and about 60 for the second portion 203.

Figure 21A:
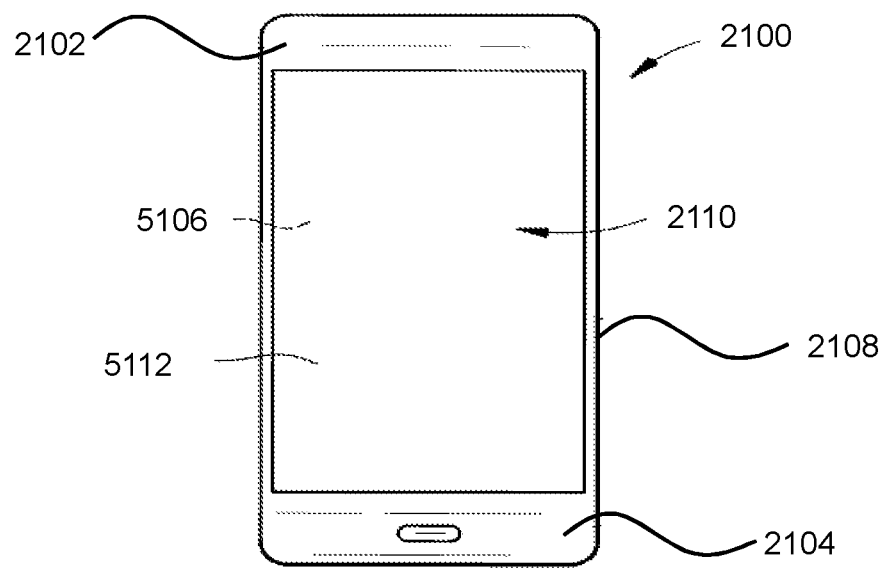
FIG. 21A is a plan view of an exemplary electronic device incorporating any of the strengthened articles disclosed herein.
Figure 21B:
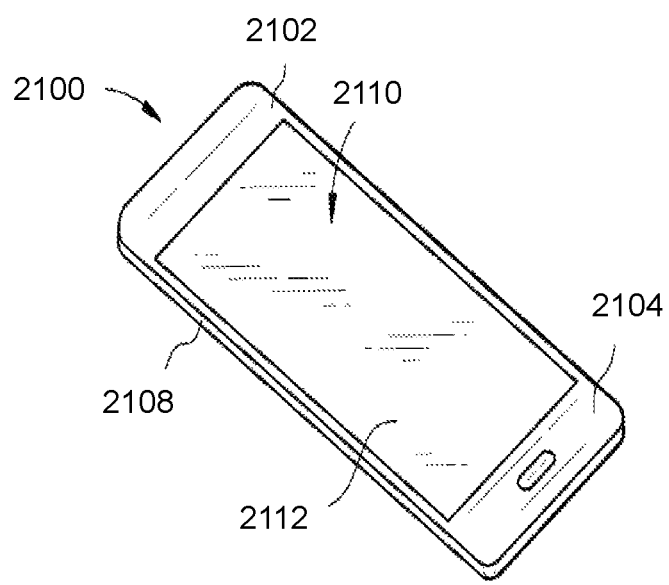
FIG. 21B is a perspective view of the exemplary electronic device of FIG. 21A.

The high hardness articles disclosed herein may be incorporated into another article such as an article with a display (or display articles) (e.g., consumer electronics, including mobile phones, tablets, computers, navigation systems, wearable devices (e.g., watches) and the like), architectural articles, transportation articles (e.g., automotive, trains, aircraft, sea craft, etc.), appliance articles, or any article that requires some transparency, scratch-resistance, abrasion resistance or a combination thereof. An exemplary article incorporating any of the high hardness articles disclosed herein is shown in FIGS. 21A and 21B. Specifically, FIGS. 21A and 21B show a consumer electronic device 2100 including a housing 2102 having front 2104, back 2106, and side surfaces 2108; electrical components (not shown) that are at least partially inside or entirely within the housing and including at least a controller, a memory, and a display 2110 at or adjacent to the front surface of the housing; and a cover substrate 2112 at or over the front surface of the housing such that it is over the display. In some embodiments, at least one of the cover substrate 2112 or a portion of housing 2102 may include any of the high hardness articles disclosed herein.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example within about 5% of each other, or within about 2% of each other.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of this disclosure provided they come within the scope of the appended claims and their equivalents.

What is claimed is:

1. A consumer electronic product, comprising:
   a housing comprising a front surface, a back surface and side surfaces;
   electrical components at least partially within the housing, the electrical components comprising at least a controller, a memory, and a display, the display at or adjacent the front surface of the housing; and
   a cover substrate disposed over the display,
   wherein at least one of a portion of the housing or the cover substrate comprises an article comprising:
      a transparent layer comprising a first major surface;
      an optical layer comprising a first major surface and a second major surface, the second major surface of the optical layer disposed on the first major surface of the transparent layer, the optical layer further comprising a first portion and a second portion that are contiguous with one another at one of the first major surface and the second major surface of the optical layer, the first portion defined between the first major surface and the second major surface of the optical layer by at least one sub-layer, the second portion defined between the first major surface and the second major surface of the optical layer by a plurality of stacked sub-layers, and a color of the first portion comprising a color difference from a color of the second portion of about 4 or more for at least one viewing angle, wherein the color difference is calculated using the equation $\sqrt{((a^*_2-a^{*1})^2+(b^*_2-b^*_1)^2)}$, with $a^*_1$ and $b^*_1$ representing the CIE color coordinates of the first portion viewed at a viewing angle and $a^*_2$ and $b^*_2$ representing the CIE color coordinates of the second portion viewed at the same viewing angle; and
      a maximum hardness of from about 10 GigaPascals (GPa) to about 50 GPa as measured by a Berkovich Indenter Hardness Test comprising an indentation depth from about 100 nanometers (nm) to about 500 nm in the article; and
   wherein the first portion and second portion are patterned to convey information.

2. The consumer electronic product of claim 1, wherein each of the first portion and the second portion comprise a reflectance value of the first major surface of the optical layer comprising a photopic average over optical wavelengths, and an absolute value of a difference between the reflectance value of the first portion and the reflectance value of the second portion is about 5% or more.

3. The consumer electronic product of claim 1,
   wherein at least one of the first or second portions exhibits reflectance color coordinates in the (L*, a*, b*) colorimetry system for at least one incidence angle from 0 degrees to 90 degrees under an International Commission on Illumination illuminant exhibiting a reference point color shift of about 12 or more from a reference point comprising at least one of the color coordinates (a*=0, b*=0), or the reflectance color coordinates of the corresponding portion of the article viewed at a reference angle,
   when the reference point is the color coordinates (a*=0, b*=0), the color shift is defined by the equation $\sqrt{((a^*_{article})^2+(b^*_{article})^2)}$, with $a^*_{article}$ and $b^*_{article}$ representing the CIE color coordinates of the article viewed at a reference viewing angle and angle of illumination, and
   when the reference point is the color coordinates of a portion viewed at a reference angle, the color shift is defined by the equation $\sqrt{(a^*_{article}-a^*_{ref})^2+(b^*_{article}-b^*_{ref})^2}$, with $a^*_{article}$ and $b^*_{article}$ representing the CIE color coordinates of the article viewed at a reference viewing angle and angle of illumination and $a^*_{ref}$ and $b^*_{ref}$ representing the CIE color coordinates of the corresponding portion of the article viewed at a reference viewing angle and angle of illumination.

4. The consumer electronic product of claim 1, wherein a difference between reflectance color coordinates in the (L*, a*, b*) colorimetry system for at least one incidence angle from 0 degrees to 90 degrees under an International Commission on Illumination illuminant exhibited by the first portion and the second portion exhibits a reference point color shift of about 12 or more from a reference point comprising at least one of the color coordinates (a*, b*) of the difference in the reflectance color coordinates between the first portion and the second portion, and the color shift is defined by the equation $\sqrt{(a^*_2-a^*_{2,ref}-a^*_1+a^*_{1,ref})^2+(b^*_2-b^*_{2,ref}-b^*_1+b^*_{1,ref})^2}$, with $a^*_1$ and $b^*_1$ representing the CIE color coordinates of the first portion viewed at a viewing angle, $a^*_2$ and $b^*_2$ representing the CIE color coordinates of the second portion at the same viewing angle, $a^*_{1,ref}$ and $b^*_{1,ref}$ representing the CIE color coordinates of the first portion viewed at a reference viewing angle and angle of illumination, and $a^*_{2,ref}$ and $b^*_{2,ref}$ representing the CIE color coordinates of the second portion viewed at the same reference viewing angle.

5. The consumer electronic product of claim 1, wherein at least one difference between a thickness of a sub-layer of the second portion and a thickness of a corresponding sub-layer of the first portion is about 20 nm or more.

6. The consumer electronic product of claim 1, wherein the plurality of sub-layers of the second portion comprises a first sub-layer comprising a first refractive index and a second sub-layer comprising a second refractive index, and a difference between the first refractive index and the second refractive index is about 0.01 or more.

7. The consumer electronic product of claim 6, wherein the first sub-layer comprises at least one of $Si_uAl_vO_xN_y$, AlN, $Si_3N_4$, $AlO_xN_y$, $SiO_xN_y$, $ZrO_2$, or $Al_2O_3$, and the second sub-layer comprises at least one of $SiO_2$, $Al_2O_3$, SiO, $AlO_xN_y$, $SiO_xN_y$, or $Si_uAl_vO_xN_y$.

8. The consumer electronic product of claim 1, wherein each of the first and second portions comprises from 1 to 10 sets of sub-layers, each set of sub-layers comprising a first sub-layer comprising a first refractive index and a second sub-layer comprising a second refractive index that is lower than the first refractive index.

9. The consumer electronic product of claim 1, wherein the maximum hardness of the article is exhibited in both a first portion of the article associated with the first portion of the optical layer and in a second portion of the article associated with the second portion of the optical layer.

10. The consumer electronic product of claim 1, wherein a hardness is from about 10 GPa to about 50 GPa measured at all indentation depths from about 100 nm to about 500 nm both in a first portion of the article associated with the first portion of the optical layer and in a second portion of the article associated with the second portion of the optical layer.

11. The consumer electronic product of claim 1, wherein the article exhibits an abrasion resistance after a 500-cycle abrasion using a Taber Test on at least one of the first major surface of the optical layer or the first major surface of the article, wherein the abrasion resistance comprises any one or more of the following:
  about 1% haze or less, as measured using a hazemeter comprising an aperture with a diameter of about 8 mm;
  an average roughness (Ra), as measured by atomic force microscopy, of about 12 nm or less;
  a scattered light intensity of about 0.05 (in units of 1/steradian) or less, at a polar scattering angle of about 40 degrees or less, as measured at normal incidence in transmission using an imaging sphere for scatter measurements, with a 2 mm aperture at 600 nm wavelength; and
  a scattered light intensity of about 0.1 (in units of 1/steradian) or less, at a polar scattering angle of about 20 degrees or less, as measured at normal incidence in transmission using an imaging sphere for scatter measurements, with a 2 mm aperture at 600 nm wavelength.

12. The consumer electronic product of claim 1, wherein the second major surface of the optical layer is in direct physical contact with the first major surface of the transparent layer.

13. The consumer electronic product of claim 1, wherein the first major surface of the optical layer is part of a first major surface of the article.

14. The consumer electronic product of claim 1, wherein the first major surface of the transparent layer comprises a curved surface.

15. The consumer electronic product of claim 1, wherein an area of the first major surface of the optical layer defining the first portion or an area of the second major surface of the optical layer defining the second portion is from about 100 $\mu m^2$ to about 5 $cm^2$.

16. The consumer electronic product of claim 1, wherein the second portion consists of exactly 1 more sub-layer than the first portion.

17. The consumer electronic product of claim 1, wherein:
  the first portion comprises 5 or more sub-layers;
  the second portion comprises 5 or more-sublayers; and
  5 or more sub-layers in the first portion are the same thickness and refractive index as 5 or more sub-layers in the second portion.

18. The consumer electronic product of claim 1, wherein the information conveyed is a trademark or logo.

19. A consumer electronic product, comprising:
  a housing comprising a front surface, a back surface and side surfaces;
  electrical components at least partially within the housing, the electrical components comprising at least a controller, a memory, and a display, the display at or adjacent the front surface of the housing; and
  a cover substrate disposed over the display,
  wherein at least one of a portion of the housing or the cover substrate comprises an article comprising:
    a transparent layer comprising a first major surface;
    an optical layer comprising a first major surface and a second major surface, the second major surface of the optical layer disposed on the first major surface of the transparent layer, the optical layer further comprising a first portion and a second portion that are contiguous with one another at one of the first major surface and the second major surface of the optical layer, the first portion defined between the first major surface and the second major surface of the optical layer by at least one sub-layer, the second portion defined between the first major surface and the second major surface of the optical layer by a plurality of stacked sub-layers, each of the first portion and the second portion comprise a reflectance value of the first major surface of the optical layer comprising a photopic average over optical wavelengths, and an absolute value of a difference between the reflectance value of the first portion and the second portion is about 5% or more, and a color of the first portion comprises a color difference from a color of the second portion of about 4 or less for at least one viewing angle, wherein color difference is calculated using the equation $\sqrt{((a^*_2-a^*_1)^2+(b^*_2-b^*_1)^2)}$, with $a^*_1$ and $b^*_1$ representing the CIE color coordinates of the first portion viewed at a viewing angle and $a^*_2$ and $b^*_2$ representing the CIE color coordinates of the second portion viewed at the same viewing angle; and a maximum hardness of from about 10 GigaPascals (GPa) to about 50 GPa as measured by a Berkovich Indenter Hardness Test comprising an indentation depth from about 100 nm to about 500 nm in the article; and wherein the first portion and second portion are patterned to convey information.

20. The consumer electronic product of claim 19, wherein the color difference between the color of the first portion and the color of the second portion is about 4 or less for all viewing angles.

21. The consumer electronic product of claim 19, wherein the information conveyed is a trademark or logo.

* * * * *

UNITED STATES PATENT AND TRADEMARK OFFICE
CERTIFICATE OF CORRECTION

PATENT NO. : 11,254,095 B2
APPLICATION NO. : 16/586031
DATED : February 22, 2022
INVENTOR(S) : Shandon Dee Hart et al.

Page 1 of 1

It is certified that error appears in the above-identified patent and that said Letters Patent is hereby corrected as shown below:

On the Title Page

In Column 2, under item (56), under "Other Publications", Line 1, delete "Hardenss" and insert -- Hardness --.

On the page 2, in Column 2, under item (56), under "Other Publications", Line 2, delete "Understaning" and insert -- Understanding --.

In the Claims

In Column 32, Line 29, in Claim 1, delete "$\sqrt{((a^*_2-a^{*1})^2+}$" and insert -- $\sqrt{((a^*_2-a^*_1)^2+}$ --.

Signed and Sealed this
Eighteenth Day of July, 2023

Katherine Kelly Vidal
*Director of the United States Patent and Trademark Office*